United States Patent
Liu et al.

(10) Patent No.: US 11,290,999 B2
(45) Date of Patent: Mar. 29, 2022

(54) TECHNIQUES FOR FLEXIBLE RESOURCE ALLOCATION

(71) Applicant: QUALCOMM Incorporated, San Diego, CA (US)

(72) Inventors: Le Liu, Fremont, CA (US); Alberto Rico Alvarino, San Diego, CA (US); Wanshi Chen, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 122 days.

(21) Appl. No.: 16/552,797

(22) Filed: Aug. 27, 2019

(65) Prior Publication Data

US 2020/0084768 A1     Mar. 12, 2020

Related U.S. Application Data

(60) Provisional application No. 62/727,832, filed on Sep. 6, 2018.

(51) Int. Cl.
| | | |
|---|---|---|
| *H04W 72/04* | (2009.01) | |
| *H04W 4/80* | (2018.01) | |
| *H04B 1/713* | (2011.01) | |

(52) U.S. Cl.
CPC ........ *H04W 72/0446* (2013.01); *H04B 1/713* (2013.01); *H04W 4/80* (2018.02); *H04W 72/042* (2013.01)

(58) Field of Classification Search
CPC ... H04B 1/713; H04B 2201/698; H04W 4/70; H04W 88/06; H04W 4/02; H04W 72/042; H04W 4/80; H04W 72/0446
See application file for complete search history.

(56) References Cited

U.S. PATENT DOCUMENTS

| | | | |
|---|---|---|---|
| 2010/0111107 A1* | 5/2010 | Han | H04L 5/0053 370/472 |
| 2011/0134861 A1* | 6/2011 | Seo | H04L 5/00 370/329 |

(Continued)

FOREIGN PATENT DOCUMENTS

| | | | |
|---|---|---|---|
| EP | 2830378 A1 | 1/2015 | |
| WO | WO-2017030345 A1 * | 2/2017 | ........ H04L 5/0012 |

(Continued)

OTHER PUBLICATIONS

3GPP TSG RAN WG1 Meeting #93 R1-1805982 Busan, Korea, May 21-25, 2018; "On more flexible starting PRB for PDSCH/PUSCH resource allocation"; Huawei et al. (Year: 2018).*

(Continued)

*Primary Examiner* — Benjamin H Elliott, IV
(74) *Attorney, Agent, or Firm* — Qualcomm Incorporated

(57) ABSTRACT

Various aspects described herein relate to techniques for frequency hopping for a wideband allocation in wireless communications. A wideband allocation of resources for transmitting uplink wireless communications can be determined, as well as a frequency hopping offset related to one or more narrowbands for transmitting uplink wireless communications. In addition, it can be determined whether to apply the frequency hopping offset to the wideband allocation in communicating data. The data can be communicated over resources related to the wideband allocation with the frequency hopping offset applied communicating, based on determining to apply the frequency hopping offset.

46 Claims, 22 Drawing Sheets

(56) References Cited

U.S. PATENT DOCUMENTS

| | | | | |
|---|---|---|---|---|
| 2013/0089063 | A1* | 4/2013 | Yang | H04L 5/0023 370/329 |
| 2015/0009939 | A1* | 1/2015 | Zhang | H04W 72/1289 370/329 |
| 2015/0222395 | A1 | 8/2015 | Suzuki et al. | |
| 2015/0296490 | A1* | 10/2015 | Yi | H04W 52/281 370/329 |
| 2016/0127936 | A1* | 5/2016 | Chatterjee | H04W 4/70 370/252 |
| 2016/0323011 | A1* | 11/2016 | Tang | H04W 72/042 |
| 2017/0064685 | A1* | 3/2017 | Rico Alvarino | H04W 72/005 |
| 2017/0094621 | A1* | 3/2017 | Xu | H04L 47/125 |
| 2017/0164350 | A1* | 6/2017 | Sun | H04L 5/0007 |
| 2017/0303241 | A1* | 10/2017 | Yang | H04W 72/04 |
| 2017/0311326 | A1* | 10/2017 | Wong | H04W 72/0453 |
| 2017/0318565 | A1* | 11/2017 | Golitschek Edler von Elbwart | H04W 72/1289 |
| 2017/0332359 | A1* | 11/2017 | Tsai | H04B 7/0639 |
| 2017/0347268 | A1* | 11/2017 | Chen | H04B 1/7143 |
| 2017/0347354 | A1* | 11/2017 | Yang | H04L 5/0023 |
| 2018/0049176 | A1* | 2/2018 | Park | H04L 5/0053 |
| 2018/0070339 | A1* | 3/2018 | Horiuchi | H04L 5/0053 |
| 2018/0092100 | A1 | 3/2018 | Morioka et al. | |
| 2018/0123744 | A1* | 5/2018 | Nogami | H04L 1/1854 |
| 2018/0124687 | A1* | 5/2018 | Park | H04W 48/12 |
| 2018/0138940 | A1* | 5/2018 | Tang | H04W 72/042 |
| 2018/0220400 | A1* | 8/2018 | Nogami | H04L 5/0078 |
| 2018/0220404 | A1* | 8/2018 | Awad | H04W 72/042 |
| 2018/0270008 | A1* | 9/2018 | Yl | H04W 72/1289 |
| 2018/0317231 | A1* | 11/2018 | Wang | H04L 27/0006 |
| 2019/0036665 | A1* | 1/2019 | Park | H04L 5/0051 |
| 2019/0097771 | A1* | 3/2019 | Schober | H04L 5/0039 |
| 2019/0109732 | A1* | 4/2019 | Choi | H04W 72/0446 |
| 2019/0162817 | A1* | 5/2019 | Priyanto | H04B 1/713 |
| 2019/0253100 | A1* | 8/2019 | Liu | H04L 5/0044 |
| 2019/0306861 | A1* | 10/2019 | Li | H04L 5/0044 |
| 2019/0349896 | A1* | 11/2019 | Yu | H04W 72/042 |
| 2020/0008198 | A1* | 1/2020 | Urabayashi | H04W 72/0453 |
| 2020/0021406 | A1* | 1/2020 | Al-Lmari | H04L 5/0094 |
| 2020/0059390 | A1* | 2/2020 | Zhang | H04L 1/0004 |
| 2020/0084768 | A1* | 3/2020 | Liu | H04B 1/713 |
| 2020/0266946 | A1* | 8/2020 | Kim | H04L 5/0048 |
| 2020/0343938 | A1* | 10/2020 | Medina Acosta | H04L 27/2607 |

FOREIGN PATENT DOCUMENTS

| | | | | |
|---|---|---|---|---|
| WO | 2018063845 | A1 | 4/2018 | |
| WO | WO-2018063845 | A1 * | 4/2018 | H04L 5/0012 |
| WO | 2018082527 | A1 | 5/2018 | |

OTHER PUBLICATIONS

3GPP TSG-RAN WG1 Meeting #93 R1-1806010 Busan, Korea, May 21-25, 2018; "On Frequency Hopping for Ultra-reliable Transmission"; Ericsson (Year: 2018).*

3GPP TSG RAN WG1 #93 R1-1806562 Busan, Korea, May 21-25, 2018; "On flexible PDSCH/PUSCH PRB allocation in efeMTC"; Sony (Year: 2018).*

3GPP TSG-RAN WG1 Meeting #94 Tdoc R1-1808988 Gothenburg, Sweden, Aug. 20-24, 2018; "Maintenance for Flexible PDSCH/PUSCH starting PRB for Rel-15 LTE-MTC"; Ericsson (Year: 2018).*

3GPP TSG RAN WG1 Meeting #94 R1-1809526 Gothenburg, Sweden, Aug. 20-24, 2018; "Summary of Flexible PDSCH/PUSCH starting PRB"; Samsung (Year: 2018).*

3GPP TSG-RAN WG1 Meeting #94 R1-1809994 Gothenburg, Sweden, Aug. 20-24, 2018; "Summary of maintenance issues on frequency hopping"; Ericsson (Year: 2018).*

"Digital Hopping of Narrowband Waveform using Wideband Frontend"; Gulzar et al.; ICACT; Feb. 19-22, 2017 (Year: 2017).*

"Digital Hopping of Narrowband Waveform using Wideband Frontend"; Gulzar et al.; ICACT2017 Feb. 19-22, 2017 (Year: 2017 ).*

"Flexible Resource Allocation for efeMTC", Appendix—1, 2018, 14 Pages.

Fujitsu: "Discussion on Frequency Domain Resource Allocation", 3GPP Draft; R1-1717718, Discussion on Frequency Domain Resource Allocation Final, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017 Oct. 8, 2017 (Oct. 8, 2017), XP051340903, Retrieved from the Internet: URL:http://www.3gpp.org/ftp/Meetings_3GPP_SYNC/RAN1/Docs/ [retrieved on Oct. 8, 2017], 4 pages.

QUALCOMM Incorporated: "Supported of Larger Data Channel Bandwidth," 3GPP Draft; R1-1611621 Support of Larger Data Channel Bandwidth, 3rd Generation Partnership Project (3GPP), Mobile Competence Centre; 650, Route Des Lucioles; F-06921 Sophia-Antipolis Cedex; France, vol. RAN WG1, No. Reno, Nevada, USA; Nov. 14, 2016-Nov. 18, 2016, Nov. 13, 2016, XP051175595, 6 Pages, Retrieved from the Internet: URL: http://www.3gpp.org/ftp/Meetings_3GPP_SYNC/RAN1/Docs/[retrieved on Nov. 13, 2016].

QUALCOMM: "Flexible allocation for PDSCH and PUSCH for efeMTC", Appendix-2, R1-18xxxxx, 3GPP TSG RAN NG1 Meeting #92, Athens, Greece, February 26-Mar. 2, 2018, pp. 1-5.

QUALCOMM: "Flexible allocation for PDSCH and PUSCH for efeMTC", Appendix-3, R1-18xxxxx, 3GPP TSG RAN WG1 Meeting #93, Busan, Korea, May 21-25, 2018, pp. 1-10.

International Search Report and Written Opinion for corresponding International Application No. PCT/US2019/048623 dated Nov. 20, 2019.

* cited by examiner

Table 5.2
DCI format 6-0B

| RIV | $RB_{start}$ | $L_{CRB}$ |
|---|---|---|
| 0 | 0 | 1 |
| 1 | 1 | 1 |
| 2 | 2 | 1 |
| 3 | 3 | 1 |
| 4 | 4 | 1 |
| 5 | 5 | 1 |
| 6 | 0 | 2 |
| 7 | 2 | 2 |

Limited RA with length of 1RB or 2RBs

Table 5.3
DCI format 6-1B

| RIV | $RB_{start}$ | $L_{CRB}$ |
|---|---|---|
| 0 | 0 | 4 |
| 1 | 0 | 6 |

Limited RA with length of 4RB or 6RBs

Table 5.1
For DCI format 6-0A and 6-1A

| RIV | $RB_{start}$ | $L_{CRB}$ |
|---|---|---|
| 0 | 0 | 1 |
| 1 | 1 | 1 |
| 2 | 2 | 1 |
| 3 | 3 | 1 |
| 4 | 4 | 1 |
| 5 | 5 | 1 |
| 6 | 0 | 2 |
| 7 | 1 | 2 |
| 8 | 2 | 2 |
| 9 | 3 | 2 |
| 10 | 4 | 2 |
| 12 | 0 | 3 |
| 13 | 1 | 3 |
| 14 | 2 | 3 |
| 15 | 3 | 3 |
| 18 | 0 | 4 |
| 19 | 1 | 4 |
| 20 | 2 | 4 |
| 17 | 0 | 5 |
| 16 | 1 | 5 |
| 11 | 0 | 6 |

FIG. 5

Table 6.1

| BW | Number of RBs | RBG size | Number of NBs | $n_{NB} = 0, ..., (N_{NB}/2-1)$ in 1st half BW | $n_{NB} = (N_{NB}/2), ..., (N_{NB}-1)$ in 2nd half BW |
|---|---|---|---|---|---|
| 1.4MHz | 6 | 1 | 1 | [0, 5] | |
| 3MHz | 15 | 2 | 2 | [-1+0, 5+1] | [0, 5] |
| 5MHz | 25 | 2 | 4 | [0, 5] | [-1+0, 5+1] |
| 10MHz | 50 | 3 | 8 | [-1+0, 5+2] | [-1+0, 5+2] |
| 15MHz | 75 | 4 | 12 | [-1+0, 5+1] for $n_{NB}$ mod 2 = 0; [-3+0, 5+3] for $n_{NB}$ mod 2 = 1; | [-2+0, 5] for $n_{NB}$ mod 2 = 0; [0, 5+2] for $n_{NB}$ mod 2 = 1; |
| 20MHz | 100 | 4 | 16 | [-2+0, 5] for $n_{NB}$ mod 2 = 0; [0, 5+2] for $n_{NB}$ mod 2 = 1; | [-2+0, 5] for $n_{NB}$ mod 2 = 0; [0, 5+2] for $n_{NB}$ mod 2 = 1; |

410
BW = 20MHz

[-2+0, 5][0, 5+2]

Table 9.1

| RIV | RB$_{start}$ | L$_{CRB}$ |
|-----|--------------|-----------|
| 21  | -1           | 2         |
| 22  | -1           | 3         |
| 23  | -1           | 4         |
| 24  | -1           | 5         |
| 25  | -1           | 6         |
| 26  | 1→0          | 6         |
| 27  | -2           | 5         |
| 28  | -2           | 4         |
| 29  | -2           | 3         |
| 30  | -2           | 6         |
| 31  | 3→1          | 5         |

Table 9.2 for [-2+0, 5]

| RB | -2 | -1 | 0 | 1 | 2 | i-th NB 3 | 4 | 5 | 5+1 | 5+2 |
|----|----|----|---|---|---|---|---|---|-----|-----|
| RIV |   |   |   |   |   |   |   |   |     |     |
| 21  |   |   |   |   |   |   |   |   |     |     |
| 22  |   |   |   |   |   |   |   |   |     |     |
| 23  |   |   |   |   |   |   |   |   |     |     |
| 24  |   |   |   |   |   |   |   |   |     |     |
| 25  |   |   |   |   |   |   |   |   |     |     |
| 26  |   |   |   |   |   |   |   |   |     |     |
| 27  |   |   |   |   |   |   |   |   |     |     |
| 28  |   |   |   |   |   |   |   |   |     |     |
| 29  |   |   |   |   |   |   |   |   |     |     |
| 30  |   |   |   |   |   |   |   |   |     |     |
| 31  |   |   |   |   |   |   |   |   |     |     |

Table 9.3 for [0, 5+2]

| RB | -2 | -1 | 0 | 1 | 2 | i-th NB 3 | 4 | 5 | 5+1 | 5+2 |
|----|----|----|---|---|---|---|---|---|-----|-----|
| RIV |   |   |   |   |   |   |   |   |     |     |
| 21  |   |   |   |   |   |   |   |   |     |     |
| 22  |   |   |   |   |   |   |   |   |     |     |
| 23  |   |   |   |   |   |   |   |   |     |     |
| 24  |   |   |   |   |   |   |   |   |     |     |
| 25  |   |   |   |   |   |   |   |   |     |     |
| 26  |   |   |   |   |   |   |   |   |     |     |
| 27  |   |   |   |   |   |   |   |   |     |     |
| 28  |   |   |   |   |   |   |   |   |     |     |
| 29  |   |   |   |   |   |   |   |   |     |     |
| 30  |   |   |   |   |   |   |   |   |     |     |
| 31  |   |   |   |   |   |   |   |   |     |     |

Table 9.4

| RIV | RB$_{start}$ | L$_{CRB}$ |
|-----|--------------|-----------|
| 21  | 5            | 2         |
| 22  | 5            | 3         |
| 23  | 4            | 4         |
| 24  | -1→0         | 5         |
| 25  | -1→0         | 6         |
| 26  | 1            | 6         |
| 27  | 2            | 5         |
| 28  | 3            | 4         |
| 29  | 4            | 3         |
| 30  | 2            | 6         |
| 31  | 3            | 5         |

Table 12.1

| BW | $n_{NB} = 0, ..., (N_{NB}/2-1)$ in 1st half BW | $n_{NB} = (N_{NB}/2), ..., (N_{NB}-1)$ in 2nd half BW |
|---|---|---|
| 3MHz | $NB_{offset}=\{-1RB, 0RB\}$ | $NB_{offset}=0$ |
| 5MHz | $NB_{offset}=0$ | $NB_{offset}=\{-1RB, 0RB\}$ |
| 10MHz | | |
| 15MHz | $NB_{offset}=\{-1RB, 0RB, +1RB\}$ for $n_{NB}$ mod 2 = 0; $NB_{offset}=\{-3RB, -1RB, 0RB\}$ for $n_{NB}$ mod 2 = 1; | $NB_{offset}=\{-2RBs, 0RB\}$ for $n_{NB}$ mod 2 = 0; $NB_{offset}=\{0RB, +2RBs\}$ for $n_{NB}$ mod 2 = 1; |
| 20MHz | $NB_{offset}=\{-2RBs, 0RB\}$ for $n_{NB}$ mod 2 = 0; $NB_{offset}=\{0RB, +2RBs\}$ for $n_{NB}$ mod 2 = 1; | |

Table 12.2

| BW | $n_{NB} = 0, ..., (N_{NB}/2-1)$ in 1st half BW | $n_{NB} = (N_{NB}/2), ..., (N_{NB}-1)$ in 2nd half BW |
|---|---|---|
| 3MHz | $NB_{offset}=\{-1RB, 0RB$ or $+1RB\}$ | $NB_{offset}=0$ |
| 5MHz | $NB_{offset}=0$ | $NB_{offset}=\{-1RB, 0RB$ or $+1RB\}$ |
| 10MHz | | |
| 15MHz | $NB_{offset}=\{-1RB, 0RB, +1RB$ or $+2RBs\}$ | $NB_{offset}=\{-2RBs, -1RB, 0RB\}$ for $n_{NB}$ mod 2 = 0; $NB_{offset}=\{0RB, +1RB, +2RBs\}$ for $n_{NB}$ mod 2 = 1; |
| 20MHz | $NB_{offset}=\{-2RBs, -1RB, 0RB\}$ for $n_{NB}$ mod 2 = 0; $NB_{offset}=\{0RB, +1RB, +2RBs\}$ for $n_{NB}$ mod 2 = 1; | |

FIG. 12

For BW = 3MHz and/or BW = 5MHz

Table 13.1 for RBs in [0,5]

| RIV | RB$_{start}$ | L$_{CRB}$ |
|---|---|---|
| 21 | 0 | 2 |
| 22 | 0 | 3 |
| 23 | 0 | 4 |
| 24 | 0 | 5 |
| 25 | 0 | 6 |
| 26 | 0 | 6 |
| 27 | 1 | 5 |
| 28 | 2 | 4 |
| 29 | 3 | 3 |
| 30 | - | - |
| 31 | - | - |

NB hopping

Table 13.2 for RBs in [-1+0,5+1]

| RIV | RB$_{start}$ | L$_{CRB}$ |
|---|---|---|
| 21 | -1 | 2 |
| 22 | -1 | 3 |
| 23 | -1 | 4 |
| 24 | -1 | 5 |
| 25 | -1 | 6 |
| 26 | 1 | 6 |
| 27 | 2 | 5 |
| 28 | 3 | 4 |
| 29 | 4 | 3 |
| 30 | - | - |
| 31 | - | - |

Starting from -1

End at (5+1)

FIG. 13

For BW = 15MHz

Table 14.2 for RBs in [-1+0,5+1]:

| RIV | RB$_{start}$ | L$_{CRB}$ |
|---|---|---|
| 21 | -1 | 2 |
| 22 | -1 | 3 |
| 23 | -1 | 4 |
| 24 | -1 | 5 |
| 25 | -1 | 6 |
| 26 | 1 | 6 |
| 27 | 2 | 5 |
| 28 | 3 | 4 |
| 29 | 4 | 3 |
| 30 | 0 | 6 |
| 31 | 1 | 5 |

{ Starting from -1 (RIV 21-25) }
{ End at (5+1) (RIV 26-29) }

↕ NB hopping

Table 14.3 for RBs in [-3+0,5+3]:

| RIV | RB$_{start}$ | L$_{CRB}$ |
|---|---|---|
| 21 | -1 | 2 |
| 22 | -1 | 3 |
| 23 | -1 | 4 |
| 24 | -1 | 5 |
| 25 | -1 | 6 |
| 26 | 1 | 6 |
| 27 | 2 | 5 |
| 28 | 3 | 4 |
| 29 | 4 | 3 |
| 30 | 2 | 6 |
| 31 | 3 | 5 |

{ Starting from -1 }
{ End at (5+1) }
{ End at (5+2) }

↕ NB hopping

Table 14.4 for RBs in [-2+0,5]:

| RIV | RB$_{start}$ | L$_{CRB}$ |
|---|---|---|
| 21 | -1 | 2 |
| 22 | -1 | 3 |
| 23 | -2 | 4 |
| 24 | -2 | 5 |
| 25 | -2 | 6 |
| 26 | 0 | 6 |
| 27 | 1 | 5 |
| 28 | 2 | 4 |
| 29 | 3 | 3 |
| 30 | 0 | 6 |
| 31 | 1 | 5 |

{ Starting from -1 }
{ Starting from -2 }

↕ NB hopping

Table 14.5 for RBs in [0,5+2]:

| RIV | RB$_{start}$ | L$_{CRB}$ |
|---|---|---|
| 21 | 0 | 2 |
| 22 | 0 | 3 |
| 23 | 0 | 4 |
| 24 | 0 | 5 |
| 25 | 0 | 6 |
| 26 | 1 | 6 |
| 27 | 2 | 5 |
| 28 | 4 | 4 |
| 29 | 6 | 3 |
| 30 | 2 | 6 |
| 31 | 3 | 5 |

{ End at (5+1) }
{ End at (5+2) }

FIG. 14A

For BW = 10MHz

Table 14.6 for RBs in [-1+0, 5+2]

| RIV | RB$_{start}$ | L$_{CRB}$ |
|---|---|---|
| 21 | -1 | 2 |
| 22 | -1 | 3 |
| 23 | -1 | 4 |
| 24 | -1 | 5 |
| 25 | -1 | 6 |
| 26 | 2 | 6 |
| 27 | 3 | 5 |
| 28 | 4 | 4 |
| 29 | 5 | 3 |
| 30 |  |  |
| 31 |  |  |

Starting from -1 (RIV 21–25)

End at (5+2) (RIV 26–29)

FIG. 14B

For BW = 20MHz

Table 14.7 for RBs in [-2+0,5]

| RIV | RB$_{start}$ | L$_{CRB}$ |
|---|---|---|
| 21 | -2 | 2 |
| 22 | -2 | 3 |
| 23 | -2 | 4 |
| 24 | -2 | 5 |
| 25 | -2 | 6 |
| 26 | 0 | 6 |
| 27 | 1 | 5 |
| 28 | 2 | 4 |
| 29 | 3 | 3 |
| 30 | 0 | 2 |
| 31 | -1 | 2 |

Starting from -2 (rows 21-25)
Start from -1 (row 31)

Table 14.8 for RBs in [0,5+2]

| RIV | RB$_{start}$ | L$_{CRB}$ |
|---|---|---|
| 21 | 0 | 2 |
| 22 | 0 | 3 |
| 23 | 0 | 4 |
| 24 | 0 | 5 |
| 25 | 0 | 6 |
| 26 | 1 | 6 |
| 27 | 2 | 5 |
| 28 | 4 | 4 |
| 29 | 6 | 3 |
| 30 | 2 | 2 |
| 31 | 3 | 2 |

End at (5+2) (rows 26-31)

FIG. 14C

Table 15

| BW | $n_{NB} = 0, \ldots, (N_{NB}/2-1)$ in 1st half BW | $n_{NB} = (N_{NB}/2), \ldots, (N_{NB}-1)$ in 2nd half BW |
|---|---|---|
| 3MHz | $NB_{offset} = \{-1RB, 0\}$ | $NB_{offset} = 0$ |
| 5MHz | $NB_{offset} = 0$ | $NB_{offset} = \{-1RB, 0\}$ |
| 10MHz | $NB_{offset} = \{-1RB, 0\}$ | |
| 15MHz | $NB_{offset} = \{-1RB, 0\}$ | $NB_{offset} = \{-2RBs, 0\}$ for $n_{NB}$ mod $2 = 0$; $NB_{offset} = 0$ for $n_{NB}$ mod $2 = 1$; |
| 20MHz | $NB_{offset} = \{-2RBs, 0\}$ for $n_{NB}$ mod $2 = 0$; $NB_{offset} = 0$ for $n_{NB}$ mod $2 = 1$; | |

FIG. 15

TECHNIQUES FOR FLEXIBLE RESOURCE ALLOCATION

CLAIM OF PRIORITY UNDER 35 U.S.C. § 119

The present Application for Patent claims priority to Provisional Application No. 62/727,832, entitled "TECHNIQUES FOR FLEXIBLE RESOURCE ALLOCATION" filed Sep. 6, 2018, which is assigned to the assignee hereof and hereby expressly incorporated by reference herein for all purposes.

BACKGROUND

Aspects of the present disclosure relate generally to wireless communications systems, and more particularly, to techniques for flexible resource allocation for machine-type communication (MTC) in wireless communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is the 4th Generation (4G) communications technology, for example, Long Term Evolution (LTE) or LTE-Advanced (LTE-A). However, although newer multiple access systems, such as an LTE or LTE-A system, deliver faster data throughput than older technologies, such increased downlink rates have triggered a greater demand for higher-bandwidth content, such as high-resolution graphics and video, for use on or with mobile devices. As such, demand for bandwidth, higher data rates, better transmission quality as well as better spectrum utilization, and lower latency on wireless communications systems continues to increase.

The 5th Generation (5G) New Radio (NR) communications technology, used in a wide range of spectrum, is envisaged to expand and support diverse usage scenarios and applications with respect to current mobile network generations. In an aspect, 5G NR communications technology includes, for example: enhanced mobile broadband (eMBB) addressing human-centric use cases for access to multimedia content, services and data; ultra-reliable low-latency communications (URLLC) with strict requirements, especially in terms of latency and reliability; and massive machine-type communications (mMTC) for a very large number of connected devices and typically transmitting a relatively low volume of non-delay-sensitive information. As the demand for mobile broadband access continues to increase, there exists a need for further improvements in 5G communications technology and beyond. Preferably, these improvements should be applicable to other multi-access technologies and the telecommunication standards that employ these technologies.

Accordingly, due to the requirements for higher data rates, lower power or battery consumption, and lower latency, new approaches or techniques may be desirable to improve physical layer procedures and signal scheduling to enhance or increase system capacity and spectral efficiency, to satisfy consumer demand, and/or to improve user experience in wireless communications, e.g., in a 4G LTE network or a 5G NR network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

According to an example, a method for wireless communication is provided that includes determining a wideband allocation of resources or a flexible allocation of resources over wideband for transmitting uplink wireless communications, determining a frequency hopping offset related to one or more narrowbands of resources for transmitting uplink wireless communications, determining whether to apply the frequency hopping offset to the wideband allocation in communicating data, and communicating, based on determining to apply the frequency hopping offset, the data over resources related to the wideband allocation with the frequency hopping offset applied.

In another example, an apparatus for wireless communication is provided that includes a transceiver, a memory configured to store instructions, and one or more processors communicatively coupled with the transceiver and the memory. The one or more processors are configured to determine a wideband allocation of resources for transmitting uplink wireless communications, determine a frequency hopping offset related to one or more narrowbands for transmitting uplink wireless communications, determine whether to apply the frequency hopping offset to the wideband allocation in communicating data, and communicate, based on determining to apply the frequency hopping offset, the data over resources related to the wideband allocation with the frequency hopping offset applied.

In another example, an apparatus for wireless communication is provided that includes means for determining a wideband allocation of resources for transmitting uplink wireless communications, means for determining a frequency hopping offset related to one or more narrowbands for transmitting uplink wireless communications, means for determining whether to apply the frequency hopping offset to the wideband allocation in communicating data, and means for communicating, based on determining to apply the frequency hopping offset, the data over resources related to the wideband allocation with the frequency hopping offset applied.

In another example, a computer-readable medium including code executable by one or more processors for wireless communication is provided. The code includes code for determining a wideband allocation of resources for transmitting uplink wireless communications, determining a frequency hopping offset related to one or more narrowbands for transmitting uplink wireless communications, determining whether to apply the frequency hopping offset to the wideband allocation in communicating data, and communicating, based on determining to apply the frequency hopping offset, the data over resources related to the wideband allocation with the frequency hopping offset applied.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

FIG. 5 are three examples of tables representing resource allocation for bandwidth-reduced low-complexity (BL) or coverage enhanced (CE) UEs, according to one or more of the presently described aspects.

FIG. 6 is an example of a table used for resource allocation for DCI format 6-0A and/or DCI format 6-1A, with various system BWs, according to one or more of the presently described aspects.

FIG. 7 is an example of a resource allocation scheme used by a UE or a base station having a system BW of 3 MHz or 5 MHz, according to one or more of the presently described aspects.

FIG. 8 is an example of a resource allocation scheme used by a UE or a base station having a system BW of 10 MHz, according to one or more of the presently described aspects.

FIG. 9 is an example of a resource allocation scheme used by a UE or a base station having a system BW of 20 MHz, according to one or more of the presently described aspects.

FIG. 10 is an example of a resource allocation scheme used by a UE or a base station having a system BW of 15 MHz, according to one or more of the presently described aspects.

FIG. 11 is an example of a flexible resource allocation scheme used by a UE or a base station for uplink transmissions, according to one or more of the presently described aspects.

FIG. 12 is an example of a first resource allocation scheme used by a UE or a base station to indicate NB offset(s), according to one or more of the presently described aspects.

FIG. 13 is an example of a resource allocation scheme with NB hopping used by a UE or a base station having a system BW of 3 MHz or 5 MHz, according to one or more of the presently described aspects.

FIG. 14A is an example of a resource allocation scheme with NB hopping used by a UE or a base station having a system BW of 15 MHz, according to one or more of the presently described aspects.

FIG. 14B is an example of a resource allocation scheme with NB hopping used by a UE or a base station having a system BW of 10 MHz, according to one or more of the presently described aspects.

FIG. 14C is an example of a resource allocation scheme with NB hopping used by a UE or a base station having a system BW of 20 MHz, according to one or more of the presently described aspects.

FIG. 15 is an example of a second resource allocation scheme used by a UE or a base station to indicate NB offset(s), according to one or more of the presently described aspects.

DETAILED DESCRIPTION

Figure 1:
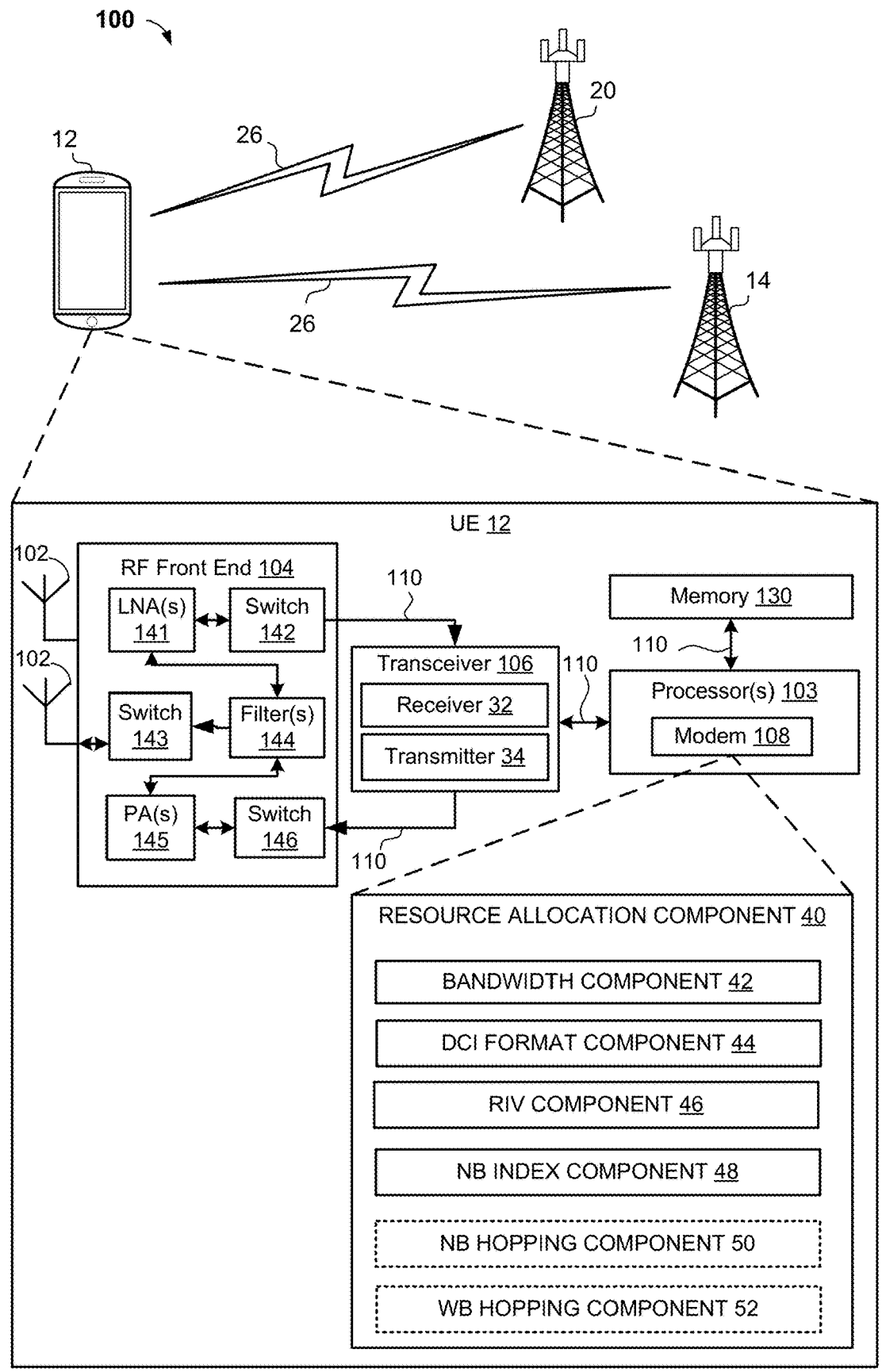
FIG. 1 is a block diagram illustrating a first example of a wireless communications system including a user equipment (UE) communicating with one or more base stations to perform resource allocation operations, according to one or more of the presently described aspects.

In wireless communications, for example, a number of resource block(s) may be grouped together to form a resource block group (RBG) which varies depending on the system bandwidth. The size of an RBG may be different from another RBG, and may depend on the system bandwidth. In a 4G (e.g., LTE) network or a 5G NR network, misalignment between resource block groups (RBGs) and narrow bands (NBs) may result in system performance degradations, for example, decreased downlink cell throughput or fragmentation of the spectrum for uplink transmissions.

As such, new or improved approaches or schemes may be desired. In some examples, a user equipment (UE) may use or be configured to have more flexible downlink and/or uplink resource allocation (RA) mechanism that may help to avoid or significantly reduce the above-mentioned degradations. In some aspects, the flexible downlink and/or uplink resource allocation mechanism may be used in enhanced machine-type communication (eMTC) or even further eMTC (efeMTC). For example, the UE may be a bandwidth-reduced low-complexity (BL) or coverage enhanced (CE) UE. In an aspect, the BL/CE UE may be capable of a coverage enhancement mode or configured in a coverage enhancement mode, and may intend to access a cell in a coverage enhancement mode.

In some implementations, the UE (e.g., a BL/CE UE) may consider or use a more flexible downlink and/or uplink resource allocation mechanism in the specification of a wireless communication standard (e.g., the Third Generation Partnership Project (3GPP) Technical Specification (TS), Release 15). In some cases, the flexible downlink and/or uplink resource allocation mechanism may not increase or significantly increase complexity or energy consumption of the UE.

In one example, a wideband allocation of resources can be used for a type of BL/CE UE (e.g., supporting the flexible resource allocation capability), where a narrowband allocation of resources can typically be used for another type of BL/CE UEs (e.g., not supporting the flexible resource allocation capability). In general, for example, a wideband allocation of resources can be larger than (e.g., utilize a larger span of frequency resources than) a narrowband allocation. In one example, a wideband allocation of resources may include the resources of one or more defined narrowband allocations, or at least one narrowband allocation plus at least a portion of one or more additional narrowband allocations. Various cases of wideband allocations relative to narrowband allocations are described herein.

In an example, a wideband allocation of resources can use wideband resource indication values (RIVs) to indicate a flexible starting PRB to be a PRB in wideband, irrespective of the narrowband locations, and an allocation size to be no larger than that of narrowband. A narrowband allocation of resources can use the narrowband RIVs to indicate the resources within a narrowband, where the narrowband location is identified by an indicated narrowband index. In a wireless communication technology, such as 3GPP, frequency hopping patterns may be defined for the narrowband allocations to allow communications to change frequencies of narrowbands over divisions of time to provide frequency diversity for the communications, which may lead to improved receipt and processing of the communications. The frequency hopping for narrowband allocation, however, may not be able to be directly applied to the wideband allocations of resources. Aspects described herein relate to applying frequency hopping for wideband allocations of resources based on frequency hopping parameters defined for narrowband allocations of resources.

In an example, frequency hopping can be applied to wideband allocations of resources based on determining a location of resources in the wideband allocation with respect to one or more narrowband allocations. For example, frequency hopping can be applied to a wideband allocation of resources where all the resources (e.g., allocated consecutive PRBs) of the wideband allocation are fully within one or more narrowband allocations (i.e., the allocated consecutive PRBs are inside only one narrowband or the allocated consecutive PRBs are belong to N consecutive narrowband allocations, where N>1, e.g., N=2). In another example, frequency hopping can be additionally or alternatively applied to a wideband allocation of resources in some cases where the resources of the wideband allocation are partially within one or more narrowbands. In an example, this may include applying the frequency hopping where: a starting one or more resource blocks (RBs) of the wideband allocation is the PRB(s) outside narrowband allocations but where the remaining one or more RBs including the last RB of the wideband is within the narrowband allocations; or a starting one or more RBs of the wideband allocation is inside the narrowband allocations but where the remaining one or more RBs including the last RB of the wideband is the PRB(s) outside of the narrowband allocations. However, considering the potential impact on the UEs with narrowband allocations, the frequency hopping for some cases of wideband allocations may be disabled. For example, the RBs of the wideband allocation include a center PRB outside of the narrowband allocations although starting and/or ending RB(s) are within the different narrowband adjacent to the center PRB for BW=3 MHz, 5 MHz, 15 MHz or the RB(s) of the wideband allocation is(are) completely outside of the narrowband allocations.

Additionally, for example, where it is determined to apply frequency hopping based on multiple hopping schemes and determine a frequency hopping offset for the wideband allocation based on the frequency hopping offset for the narrowband allocation. In one example, higher layer signaling can be used to signal whether to apply frequency hopping that is compatible with the UEs with narrowband allocation, and the frequency hopping scheme may be selected based on this signaling.

In some aspects, the terms UE, BL/CE UE, BL UE, CE UE, NB-UE, narrowband Internet of Things (NB-IoT) UE, NB device, an MTC UE, an eMTC UE, or an efeMTC UE, may be used interchangeably, and may represent a same or similar apparatus for wireless communications.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. In some aspects, the computer-readable media may be non-transitory or include a non-transitory computer-readable storage medium.

Described herein are various aspects related to a wireless communications network, for example, a 4G network (e.g. an LTE network) or a 5G NR network, in particular, techniques for flexible downlink and/or uplink resource allocation (RA). Each of the aspects described above are performed or implemented in connection with FIGS. 1-20 which are described in more detail below. In some aspects, the methods, techniques, or schemes discussed herein may be within the limits of current specifications of various wireless communication standards (e.g., 3GPP standards). In some examples, the techniques or methods discussed herein may be implemented by or reside in hardware or software at the UE.

Referring to FIG. 1, in an aspect, a wireless communication system 100 includes at least one UE 12 (e.g., a BL, MTC, eMTC, or efeMTC UE) in communication coverage of at least one network entity 14 or network entity 20. The UE 12 may communicate with a network via the network entity 14 or network entity 20. In some aspects, multiple UEs including the UE 12 may be in communication coverage with one or more network entities, including the network entity 14 and/or the network entity 20. In an aspect, the network entity 14 or network entity 20 may be a base station, such as an eNB in a 4G LTE network or a gNB in a 5G NR network. Although various aspects are described in relation to a UMTS, LTE, or a 5G NR network, similar principles may be applied in other wireless wide area networks (WWAN). The wireless network may employ a scheme where multiple base stations may transmit on a channel. In an example, the UE 12 may transmit and/or receive wireless communications (e.g., messages or signals used for resource allocation) to and/or from the network entity 14 and/or the network entity 20. For example, the UE 12 may be actively communicating with network entity 14 and/or network entity 20, for example, to perform resource allocation procedures.

In some aspects, the UE 12 may also be referred to by those skilled in the art (as well as interchangeably herein) as an MTC UE, an eMTC UE, an efeMTC UE, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. The UE 12 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for IoT (e.g., a NB-IoT device), an MTC device, or any other similar functioning device.

In some examples, the network entity 14 or network entity 20 may be referred to as a base station, a base transceiver station, a radio base station, a radio transceiver, a basic service set (BSS), an extended service set (ESS), a NodeB, eNodeB, Home NodeB, a Home eNodeB, a gNB or some other suitable terminology. The coverage area for a base station may be divided into sectors making up only a portion of the coverage area (not shown). The wireless communications system 100 may include the network entity 14 and/or network entity 20 of different types (e.g., macro, micro, and/or pico base stations). The network entity 14 or network entity 20 may utilize different radio technologies, such as cellular and/or Wireless Local Area Network (WLAN) radio access technologies (RAT). The network entity 14 or network entity 20 may be associated with the same or different access networks or operator deployments. The coverage areas of the network entity 14 or network entity 20, including the coverage areas of the same or different types of the network entity 14 or network entity 20, utilizing the same or different radio technologies, and/or belonging to the same or different access networks, may overlap. Furthermore, the network entity 14 or network entity 20 may be substantially any type of component that may communicate with UE 12 to provide wireless network access at the UE 12.

According to the present aspects, the UE 12 may include one or more processors 103 and a memory 130 that may operate in combination with, or otherwise to implement, a resource allocation component 40, which may comprise a bandwidth component 42, downlink control information (DCI) format component 44, resource indication value (RIV) component 46, narrowband (NB) index component 48, NB hopping component 50, and/or wideband (WB) hopping component 52. In some cases, similarly, the network entity 14 or the network entity 20 may include or use one or more components discussed herein (or similar components) and be configured to perform resource allocation operations, according to one or more aspects discussed herein.

In some examples, the resource allocation component 40 may be configured to perform one or more resource allocation procedures or management as discussed herein. In an aspect, the bandwidth component 42 may be configured to identify one or more system bandwidths for communications. In an aspect, the DCI format component 44 may be configured to identify one or more DCI formats used by the UE 12, network entity 14, and/or network entity 20, as discussed herein. In another aspect, the RIV component 46 may be configured to determine, define, identify, or search for one or more RIVs (e.g., an integer value from a predetermined index or table, as discussed herein). The NB index component 48 may be configured to identify an NB index and/or an NB index offset indication. In an aspect, the NB hopping component 50 may be configured to define or identify one or more NB hopping offsets, and/or perform NB hopping as described herein. In an aspect, the WB hopping component 52 may be configured to define or identify one or more hopping offsets for wideband allocations, and/or perform hopping for wideband allocations as described herein.

In some aspects, the resource allocation component 40 may be communicatively coupled with a transceiver 106, which may include a receiver 32 for receiving and processing radio frequency (RF) signals (e.g., including DCI, resource allocation, or grants), and a transmitter 34 for processing and transmitting RF signals. The processor 103 may be communicatively coupled with the transceiver 106 and memory 130 via at least one bus 110.

The receiver 32 may include hardware, firmware, and/or software code executable by a processor for receiving data, the code comprising instructions and being stored in a memory (e.g., computer-readable medium). The receiver 32 may be, for example, a radio frequency (RF) receiver. In an aspect, the receiver 32 may receive signals transmitted by the UE 12, one or more other UEs 12 and/or one or more network entities (e.g., the network entity 14 or network entity 20). The receiver 32 may obtain measurements of the signals. For example, the receiver 32 may determine signal-to-noise ratio (SNR), RSRP, etc.

The transmitter 34 may include hardware, firmware, and/or software code executable by a processor for transmitting data, the code comprising instructions and being stored in a memory (e.g., computer-readable medium). The transmitter 34 may be, for example, a RF transmitter.

In an aspect, the one or more processors 103 may include a modem 108 that uses one or more modem processors. The various functions related to the resource allocation component 40 may be included in the modem 108 and/or processor(s) 103 and, in an aspect, may be executed by a single processor, while in other aspects, different ones of the functions may be executed by a combination of two or more different processors. For example, in an aspect, the one or more processors 103 may include any one or any combination of a modem processor, or baseband processor, or digital signal processor, or transmit processor, or transceiver processor associated with the transceiver 106. In particular, the one or more processors 103 may implement components included in the resource allocation component 40, including the bandwidth component 42, DCI format component 44, RIV component 46, NB index component 48, NB hopping component 50, and/or WB hopping component 52.

The resource allocation component 40, bandwidth component 42, DCI format component 44, RIV component 46, NB index component 48, NB hopping component 50, and/or WB hopping component 52 may include hardware, firmware, and/or software code executable by a processor for performing resource allocation management and related operations. For example, the hardware may include, for example, a hardware accelerator, or specialized processor. In an aspect, the term "component" as used herein may be one of the parts that make up a system, may be hardware, firmware, and/or software, and may be divided into other components.

Moreover, in an aspect, the UE 12 may include an RF front end 104 and the transceiver 106 for receiving and transmitting radio transmissions, for example, wireless communications 26. For example, transceiver 106 may transmit or receive one or more signals. The transceiver 106 may measure a received pilot signal in order to determine signal quality (e.g., based on RSRP, RSRQ, or RSSI) and for providing feedback to the network entity 14 or network entity 20. For example, the transceiver 106 may communicate with the modem 108 to transmit messages generated by the resource allocation component 40 and to receive messages and forward them to the resource allocation component 40.

The RF front end 104 may be communicatively couple with one or more antennas 102 and may include one or more low-noise amplifiers (LNAs) 141, one or more switches 142, 143, one or more power amplifiers (PAs) 145, and one or more filters 144 for transmitting and receiving RF signals. In an aspect, the components of the RF front end 104 may be communicatively coupled with the transceiver 106 (e.g., via one or more communication links or buses 110). The transceiver 106 may be communicatively coupled with one or more modems 108 and/or processor 103.

In an aspect, the LNA 141 may amplify a received signal at a desired output level. In an aspect, each LNA 141 may have a specified minimum and maximum gain values. In an aspect, the RF front end 104 may use one or more switches 142, 143 to select a particular LNA 141 and its specified gain value based on a desired gain value for a particular application. In an aspect, the RF front end 104 may provide measurements (e.g., Ec/Io) and/or applied gain values to the resource allocation component 40.

The one or more PA(s) 145 may be used by the RF front end 104 to amplify a signal for an RF output at a desired output power level. In an aspect, each PA 145 may have a specified minimum and maximum gain values. In an aspect, the RF front end 104 may use one or more switches 143, 146 to select a particular PA 145 and a specified gain value of the PA 145 based on a desired gain value for a particular application.

The one or more filters 144 may be used by the RF front end 104 to filter a received signal to obtain an input RF signal. Similarly, in an aspect, for example, a respective filter 144 may be used to filter an output from a respective PA 145 to produce an output signal for transmission. In an aspect, each filter 144 may be communicatively coupled with a specific LNA 141 and/or PA 145. In an aspect, the RF front end 104 may use one or more switches 142, 143, 146 to select a transmit or receive path using a specified filter 144, LNA, 141, and/or PA 145, based on a configuration as specified by the transceiver 106 and/or processor 103.

The transceiver 106 may be configured to transmit and receive wireless signals through one or more antennas 102 via the RF front end 104. In an aspect, the transceiver 106 may be tuned to operate at specified frequencies such that the UE 12 may communicate with, for example, the network entity 14 or network entity 20. In an aspect, for example, the modem 108 may configure the transceiver 106 to operate at a specified frequency and power level based on the UE configuration of the UE 12 and communication protocol used by the modem 108.

In an aspect, the modem 108 may be a multiband-multimode modem, which may process digital data and communicate with the transceiver 106 such that the digital data is sent and received using the transceiver 106. In an aspect, the modem 108 may be multiband and be configured to support multiple frequency bands for a specific communications protocol. In an aspect, the modem 108 may be multi-mode and be configured to support multiple operating networks and communications protocols. In an aspect, the modem 108 may control one or more components of the UE 12, or the network entity 14 or 20 (e.g., RF front end 104, transceiver 106), to perform resource allocation procedures or enable transmission and/or reception of signals based on a specified modem configuration. In an aspect, the modem configuration may be based on the mode of the modem and the frequency band in use. In another aspect, the modem configuration may be based on UE configuration information associated with the UE 12 as provided by the network during resource allocation, cell selection and/or cell reselection (or handover).

In some aspects, the UE 12 may further include memory 130, such as for storing data used herein and/or local versions of applications or the resource allocation component 40 and/or one or more subcomponents of the resource allocation component 40 being executed by the processor(s) 103. The memory 130 may include any type of computer-readable medium usable by a computer or processor(s) 103, such as random access memory (RAM), read only memory (ROM), tapes, magnetic discs, optical discs, volatile memory, non-volatile memory, and any combination thereof. In an aspect, for example, the memory 130 may be a computer-readable storage medium that stores one or more computer-executable codes defining resource allocation component 40 and/or one or more of the subcomponents of the resource allocation component 40, and/or data associated therewith, when the UE 12 and/or the network entity 14 or network entity 20 is operating the processor(s) 103 to execute the resource allocation component 40 and/or one or more subcomponents of the resource allocation component 40. In another aspect, for example, the memory 130 may be a non-transitory computer-readable storage medium.

Figure 2:
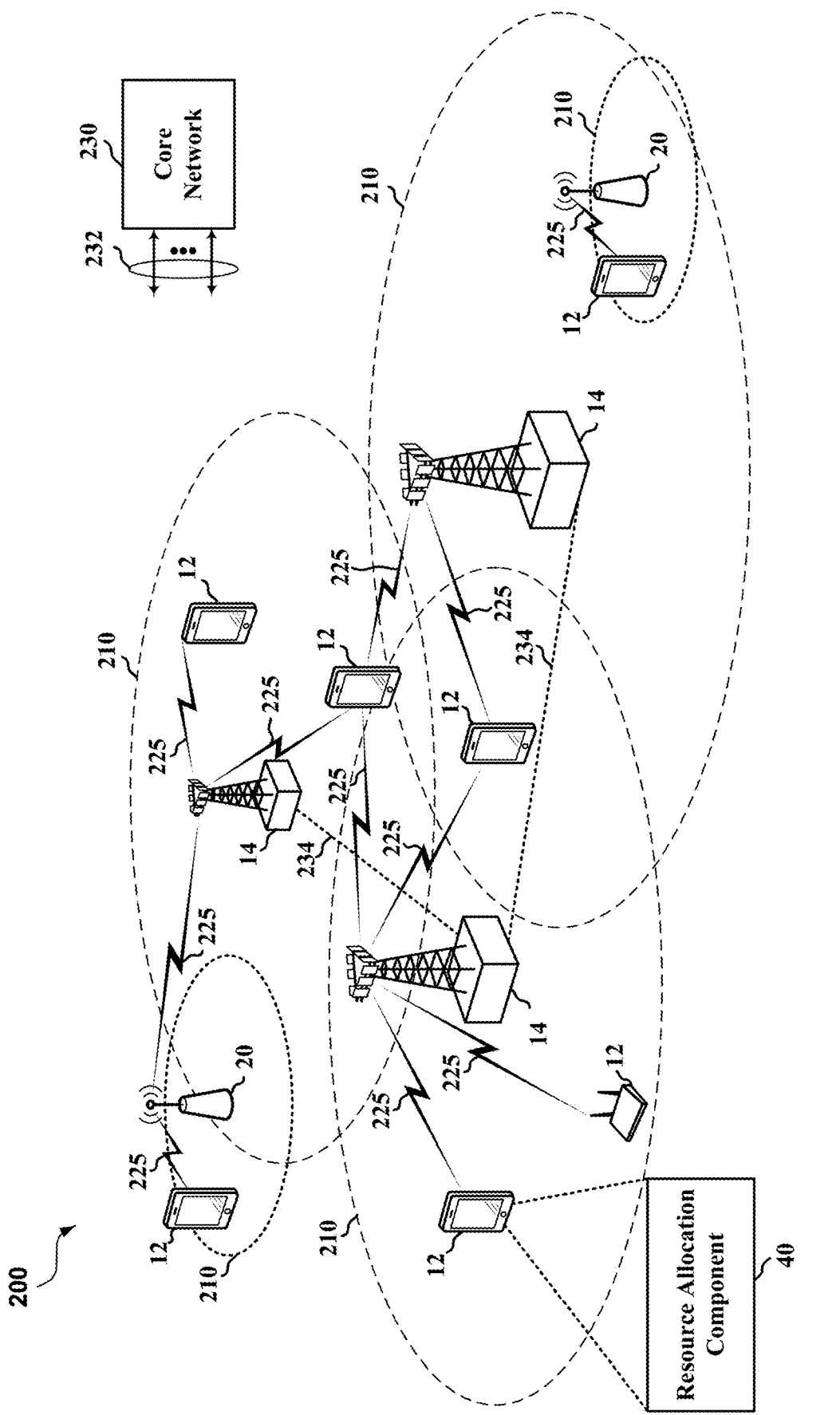
FIG. 2 is a block diagram illustrating a second example of a wireless communications system including multiple UEs for communicating with one or more base stations to perform resource allocation operations, according to one or more of the presently described aspects.

Referring to FIG. 2, a diagram illustrates an example of a wireless communications system 200, in accordance with aspects described herein. In some examples, the wireless communications system 200 may include the wireless communications system 100 in FIG. 1, and may include a plurality of network entities 14 and/or 20 (e.g., base stations, gNBs, or WLAN network entity), a number of UEs 12, and a core network 230. In an aspect, one or more UEs 12 may include the resource allocation component 40 configured to manage resource allocation. The resource allocation component 40 may be configured to perform at least some aspects of the techniques or methods described above in wireless communications, including 4G LTE or 5G NR. Some of the network entity 14 or 20 may communicate with the UEs 12 under the control of a base station controller (not shown), which may be part of the core network 230 or the network entity 14 or the network entity 20 (e.g., a base station or a gNB) in various examples.

In an aspect, the network entity 14 or 20 may communicate control or system information and/or user data with the core network 230 through backhaul links 232. In some cases, the network entity 14 or 20 may communicate, either directly or indirectly, with each other over backhaul links 234, which may be wired or wireless communication links. The wireless communications system 200 may support operation on multiple carriers (waveform signals of different frequencies). Multi-carrier transmitters may transmit modulated signals simultaneously on the multiple carriers. For example, each communication link 225 (e.g., wireless communications 26 in FIG. 1) may be a multi-carrier signal modulated according to the various radio technologies described above. Each modulated signal may be sent on a same or different carrier and may carry control or system information (e.g., control channels, RRC signals, etc.), overhead information, data, etc.

In some examples, the network entity 14 or 20 may wirelessly communicate with the UEs 12 via one or more antennas. Each of the network entity 14 or 20 may provide communication coverage for a respective coverage area 210. In some examples, the network entity 14 or 20 may be referred to as a base station, a NodeB, an eNodeB, a Home NodeB, a Home eNodeB, a gNB, or an access point. In some cases, at least a portion of the wireless communications system 200 may be configured to operate on a spatial multiplexing (e.g., multiple-input and multiple-output (MIMO)) scheme in which one or more of the UEs 12 and one or more of the network entity 14 or 20 may be configured to support transmissions on closed-loop MIMO and/or open-loop MIMO scheme.

In network communication systems using 4G (e.g., LTE/LTE-A), 5G NR, or similar communication technologies, the terms evolved Node B (eNodeB or eNB) or gNB may be used to describe the network entity 14 or 20, though concepts described herein may be applied to other types of network entity in other types of communication technologies. For example, the wireless communications system 200 may be a 4G or a 5G NR network in which different types of network entity provide coverage for various geographical regions. For example, each network entity 14 or 20 may provide communication coverage for a macro cell, a pico cell, a femto cell, and/or other types of cell. Small cells such as pico cells, femto cells, and/or other types of cells may include low power nodes or LPNs. A macro cell may cover a relatively large geographic area (e.g., several kilometers in radius) and may allow unrestricted access by UEs 12 with service subscriptions with the network provider. A small cell may cover a relatively smaller geographic area and may allow unrestricted access by UEs 12 with service subscriptions with the network provider, for example, and in addition to unrestricted access, may also provide restricted access by UEs 12 having an association with the small cell (e.g., UEs in a closed subscriber group (CSG), UEs for users in the home, and the like). A base station for a macro cell may be referred to as a macro base station. A base station for a small cell may be referred to as a small cell base station. A base station may support one or multiple (e.g., two, three, four, and the like) cells.

In some aspects, the core network 230 may communicate with the base stations or other network entity 14 or 20 via one or more backhaul links 232 (e.g., Si interface, etc.). The network entity 14 or 20 may also communicate with one another, e.g., directly or indirectly via backhaul links 234 (e.g., X2 interface, etc.) and/or via backhaul links 232 (e.g., through core network 230).

In some examples, the UEs 12 may be dispersed throughout the wireless communications system 200, and each UE 12 may be stationary or mobile (e.g., in a low mobility mode). The UE 12 may be referred to by those skilled in the art as a suitable terminology discussed herein. The UE 12 may be able to communicate with macro base stations, small cell base stations, relays, and the like. The UE 12 may be able to communicate over different access networks, such as cellular or other WWAN access networks, or WLAN access networks.

The communication links 225 (e.g., wireless communications 26 in FIG. 1) shown in wireless communications system 200 may include uplink transmissions from the UE 12 to the network entity 14 or 20, and/or downlink transmissions (e.g., resource allocation, RRC signals) from the network entity 14 or 20 to the UE 12. The downlink transmissions may also be called forward link transmissions while the uplink transmissions may also be called reverse link transmissions. The communication links 225 may carry transmissions of each hierarchical layer which, in some examples, may be multiplexed in the communication links 225. The UEs 12 may be configured to collaboratively communicate with multiple network entity 14 or 20 through, for example, MIMO, carrier aggregation (CA), Coordinated Multi-Point (CoMP), or other schemes. MIMO techniques use multiple antennas on the network entity 14 or 20 and/or multiple antennas on the UE 12 to transmit multiple data streams. The MIMO techniques may include closed-loop MIMO and/or open-loop MIMO scheme. Carrier aggregation (CA) may utilize two or more component carriers (CCs) on a same or different serving cell for data transmission. CoMP may include techniques for coordination of transmission and reception by a number of network entity 14 or 20 to improve overall transmission quality for UEs 12 as well as increasing network and spectrum utilization.

Figure 3:
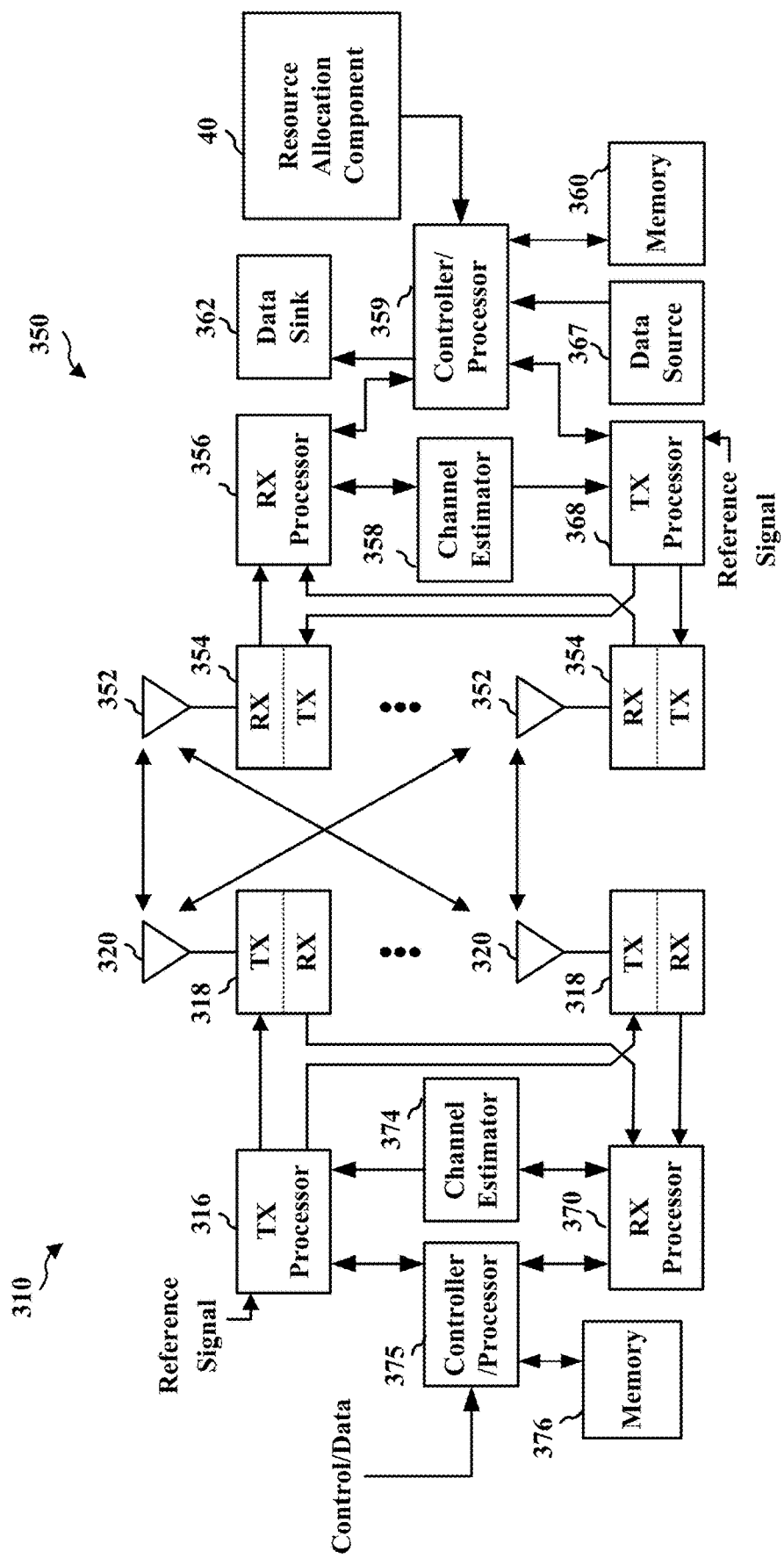
FIG. 3 is a block diagram illustrating an example of a UE communicating with a base station to perform resource allocation operations in an access network, according to one or more of the presently described aspects.

Referring to FIG. 3, a block diagram illustrates an example of a base station 310 (e.g., the network entity 14 or 20) in communication with a UE 350 (e.g., the UE 12) in an access network (e.g., the wireless communications system 100 and/or 200). In the downlink, upper layer packets from the core network are provided to a controller/processor 375. The controller/processor 375 implements the functionality of the L2 layer. In the downlink, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling (e.g., resource allocation, RRC signals) to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot signal) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission.

At the UE 350, each receiver 354RX receives a signal through a respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359.

The controller/processor 359 implements the L2 layer. The controller/processor may be associated with a memory 360 that stores program codes and data. The memory 360 may be referred to as a computer-readable medium. In the uplink, the controller/processor 359 provides demultiplexing (DEMUX) between transport and logical channels, packet reassembly, deciphering, header decompression, control signal processing to recover upper layer packets from the core network. The upper layer packets are then provided to a data sink 362, which represents all the protocol layers above the L2 layer. Various control signals may be provided to the data sink 362 for L3 processing. The controller/processor 359 may be responsible for error detection using an acknowledgement (ACK) and/or negative acknowledgement (NACK) protocol to support HARQ operations. In addition, the UE 350 may include a resource allocation component 40 configured to manage schemes of cell selections/reselections of the base station 310. Though the resource allocation component 40 is shown as communicatively coupled with controller/processor 359, substantially any processor of the UE 350 may provide the functions of the resource allocation component 40 and/or the related components described herein (e.g., in conjunction with controller/processor 359, memory 360, or otherwise). For example, TX processor 368 and/or RX processor 356 may additionally or alternatively provide one or more functions of the resource allocation component 40, as described herein.

In the uplink, a data source 367 is used to provide upper layer packets to the controller/processor 359. The data source 367 represents all protocol layers above the L2 layer. Similar to the functionality described in connection with the downlink transmission by the base station 310, the controller/processor 359 implements the L2 layer for the user plane and the control plane by providing header compression, ciphering, packet segmentation and reordering, and multiplexing between logical and transport channels based on radio resource allocations by the base station 310. The controller/processor 359 is also responsible for HARQ operations, retransmission of lost packets, and signaling to the base station 310.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The uplink transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 may be associated with a memory 376 that stores program codes and data. The memory 376 may be referred to as a computer-readable medium. In the uplink, the controller/processor 375 provides demultiplexing (DEMUX) between transport and logical channels, packet reassembly, deciphering, header decompression, control signal processing to recover upper layer packets from the UE 350. Upper layer packets from the controller/processor 375 may be provided to the core network. The controller/processor 375 may be responsible for error detection using an ACK and/or NACK protocol to support HARQ operations.

Figure 4:
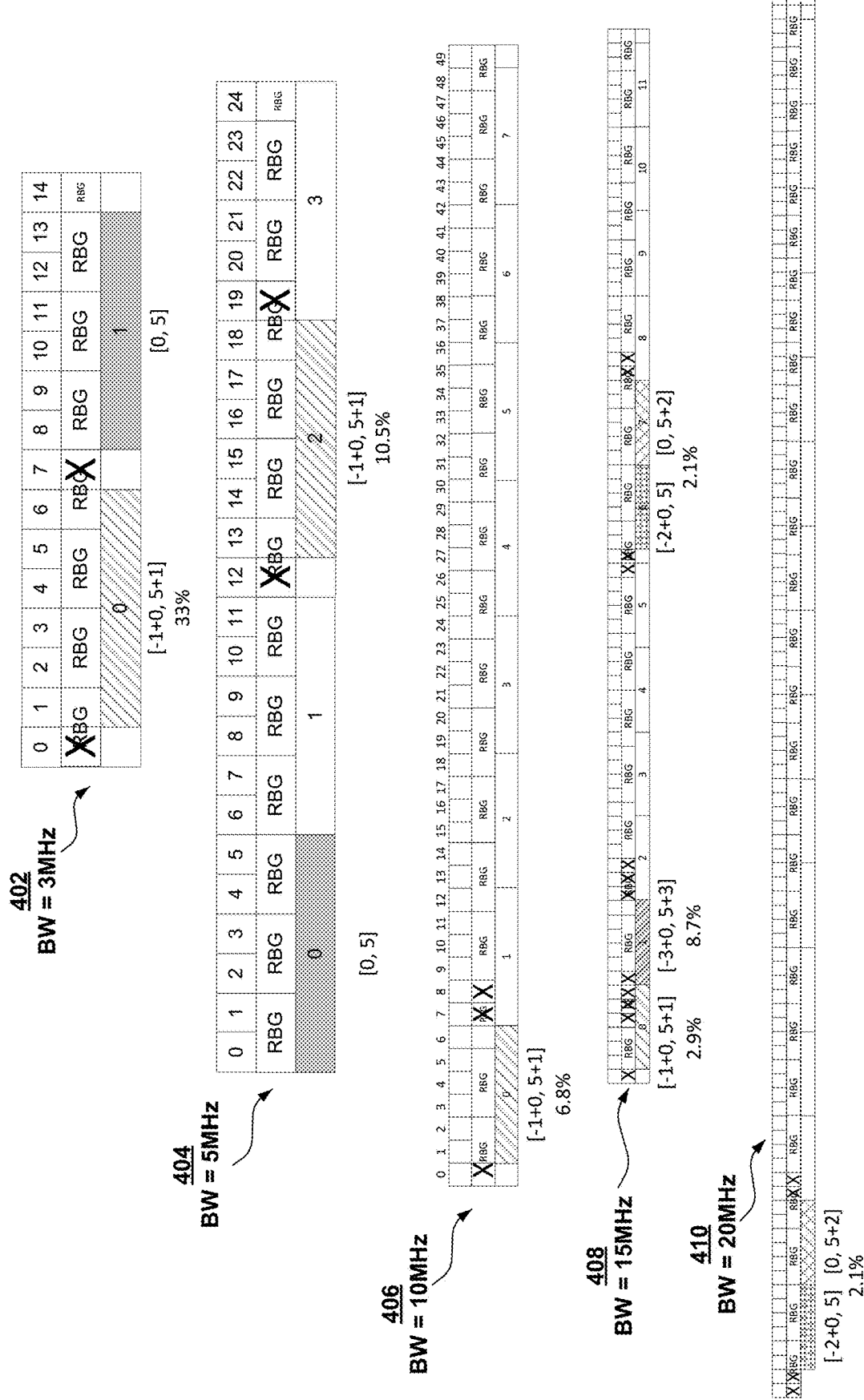
FIG. 4 are five examples of misalignment between resource block groups (RBGs) and one or more narrowbands (NBs) in different system bandwidths (BWs), according to one or more of the presently described aspects.

In an aspect, referring to FIG. 4, a wireless communication system may encounter misalignment between RBGs and NBs. In some examples, a UE (e.g., UE 12) may be in an LTE network using LTE RBGs, or in a 5G NR (or LTE) network using NBs. For example, in LTE (or 5G NR), bitmap-based resource assignment information may be used to indicate one or more RBGs that are scheduled for a non-BL or non-CE UE. The RBG size may be different and predetermined for each system bandwidth. Meanwhile, for a BL UE (or a BL/CE UE, MTC UE, eMTC UE, feMTC UE, efeMTC UE) in LTE, the NB locations may be defined or configured as a wideband allocation to indicate a starting PRB over wideband and a allocated size with a number (e.g., six) of non-overlapping consecutive PRBs in frequency domain. The NB index location is shown in FIG. 4 for BWs that equal to 3 MHz, 5 MHz, 10 MHz, 15 MHz, and 20 MHz, respectively.

In an example, if the total number of RBs in a BW is an odd number, the center RB may not belong to any NBs in the BW, resulting in different misalignment with RBGs in the first half and/or second half BW. In an aspect, the even/odd NB location may have different RB offset(s) relative to one or more neighbor RBG boundaries. In another aspect, different RBG size(s) may take into account and may cause different RB offset(s) between the NB and one or more RBG boundaries. In some cases, the PRB utilization loss may depend on allocated NB(s) and/or the total system BW, where the PRB utilization loss may be the wasted RBs normalized by the remaining RBs for non-BL UE(s) when one or more 6-PRB NBs are allocated to a BL UE. In an example, the misalignment between LTE RBGs and NBs may result in a degradation of, for example, zero to thirty-three percent (0~33%) of physical RBs (PRB) utilization, and may degrade the downlink cell throughputs. In some examples, when the RBGs and NBs are aligned, there may be a minimized loss or reduced loss that is close to 0% degradation.

In another aspect, for uplink, the UE or a base station (e.g., network entity 14 or network entity 20) may be difficult to utilize the NBs which may not be directly adjacent to the resources used for uplink transmissions, for example, physical uplink control channel (PUCCH) or physical random access channel (PRACH), causing to fragmentation of the spectrum (e.g., for uplink transmissions).

In an aspect, for example, as shown in FIG. 4, in a conventional wireless communication network (e.g., an LTE network), the system bandwidth (BW) may be 3 MHz, 5 MHz, 10 MHz, 15 MHz, and/or 20 MHz. In an aspect, cross marks in one or more RBGs are used to identify the RBs that may not be used by NB or MTC due to misalignment between NBs and RBGs. In an example, the UE may use a frame structure 402 having a 3 MHz LTE BW, with one or more RBGs each having two RBs or PRBs, and one or more NBs each having six RBs or PRBs. For the first NB ($n_{NB}=0$) in the first half BW (RB 0 to RB 7) of the frame structure 402, there are two offsets, a first offset between the first NB and the first RBG, and the second offset between the first NB and the fourth RBG. In other words, the first NB is not aligned with the RBG boundaries, causing misalignment between the LTE RBGs and the first NB, shown as crosses in RBGs. In this case, the resource utilization loss is about one third or thirty-three percent (33%) due to the misalignment. In contrast, in the second half BW (RB 8 to RB 14) of the frame structure 402, the second NB ($n_{NB}=1$) is aligned with the RBG boundaries, for example, the left (or starting) boundary of the fifth RBG and the right (or ending) boundary of the seventh RBG, as shown in FIG. 4. Thus, the second half BW has minimized or low resource utilization loss due to the second NB being aligned with the RBG boundaries.

In another example, the UE may use a frame structure 404 having a 5 MHz LTE BW, with one or more RBGs each having two RBs or PRBs, and one or more NBs each having six RBs or PRBs. For the third NB ($n_{NB}=2$) in the second half BW (RB 12 to RB 24) of the frame structure 404, there are two offsets, a first offset between the third NB and the seventh RBG, and the second offset between the third NB and the tenth RBG. In other words, the third NB is not aligned with the RBG boundaries, causing misalignment between the LTE RBGs and the third NB, shown as crosses in RBGs. In this case, the resource utilization loss is about 10.5% due to the misalignment. In contrast, in the first half BW (RB 0 to RB 11) of the frame structure 404, the first NB ($n_{NB}=0$) is aligned with the RBG boundaries, for example, the left (or starting) boundary of the first RBG and the right (or ending) boundary of the third RBG, as shown in FIG. 4. As such, in this example, the first half BW has minimized or low resource utilization loss due to the first NB being aligned with the RBG boundaries.

In yet another example, the UE may use a frame structure 406 having a 10 MHz LTE BW, with one or more RBGs each having three RBs or PRBs, and one or more NBs each having six RBs or PRBs. In this example, the first NB ($n_{NB}=0$) of the frame structure 406 is not aligned with the RBG boundaries. For example, there is a first offset between the first NB and the first RBG, and a second offset between the first NB and the third RBG, causing misalignment between the LTE RBGs and the first NB, shown as crosses in RBGs in FIG. 4. In this case, the resource utilization loss is about 6.8% due to the misalignment, as shown in FIG. 4.

In an aspect, the UE may be an MTC UE (e.g., an eMTC or efeMTC UE), and may share the system bandwidth with one or more LTE UEs. In some aspects, the resource utilization loss may be the spectrum loss to the LTE UEs because of wasted RBs/PRBs when a NB is allocated to the MTC UE. In an aspect, the utilization loss may equal to $N_{offset}/(N_{RB}-N_{NB})$, where $N_{RB}$ is the total number of RBs, $N_{NB}$ is the number of narrowband RBs for the MTC UE (e.g., $N_{NB}=6$ for the calculation). $N_{offset}$ is the total number of misaligned RBs between the NB and RBG boundaries. For example, in case of BW=10 MHz, $N_{RB}=50$, $N_{NB}=6$, $N_{offset}=3$, the resource utilization loss=3/(50−6)=6.8%, as discussed above, and as shown in FIG. 4.

In an example, the UE may use a frame structure 408 having a 15 MHz LTE BW, with one or more RBGs each having four RBs or PRBs, and one or more NBs each having six RBs or PRBs. For the second NB ($n_{NB}=1$) of the frame structure 408, there are two offsets, a first offset between the second NB and the second RBG, and the second offset between the second NB and the fourth RBG. In other words, the second NB is not aligned with the RBG boundaries, causing misalignment between the LTE RBGs and the second NB, shown as crosses in RBGs in FIG. 4. In this case, the resource utilization loss is about 8.7% due to the misalignment. Similarly, the first NB ($n_{NB}=0$) has about 2.9% resource utilization loss, the seventh NB ($n_{NB}$=6) and the eighth NB ($n_{NB}$=0) have about 2.1% resource utilization loss, which are due to misalignment with the RBG boundaries in the frame structure 408, shown as crosses in RBGs in FIG. 4.

In another example, the UE may use a frame structure 410 having a 20 MHz LTE BW, with one or more RBGs each having four RBs or PRBs, and one or more NBs each having six RBs or PRBs. For the first NB and second NB ($n_{NB}$=0, 1) of the frame structure 410, there is an offset between the first NB and the first RBG, and another offset between the second NB and the fourth RBG. In other words, the first NB and second NB are not aligned with the RBG boundaries, causing misalignment between the LTE RBGs and the first NB and second NB, shown as crosses in RBGs in FIG. 4. In this case, the resource utilization loss is about 2.1% due to the misalignment.

In an aspect, referring to FIG. 5, in a conventional wireless communication network (e.g., an LTE network), a UE (e.g., UE 12) may be configured to perform RA for legacy CE mode A or mode B. For example, for 1.4 MHz BL/CE UEs, the resource block (RB) assignment information may be represented as:

NB index: $n_{NB}$=0 ... ($N_{NB}$−1), with $$N_{NB} = \left\lfloor \frac{N_{RB}}{6} \right\rfloor,$$

where $N_{RB}$ is the total number of RBs, and

RA within the indicated NB (e.g., $N_{RB}$=6 PRBs) using an RIV corresponding to a starting RB ($RB_{START}$) and a length in terms of contiguously allocated resource blocks (CRBs) ($L_{CRBs} \geq 1$).

In an aspect, for Downlink Control Information (DCI) format 6-0A (for uplink) and 6-1A (for downlink), a 5-bit Resource Indication Value (RIV) may be used having a valid value from 0 to 20, and can be found in Table 5.1 in FIG. 5 that being calculated by the following equations:

If $(L_{CRBs}-1) \leq \lfloor N_{RB}/2 \rfloor$, $RIV = N_{RB}(L_{CRBs}-1) + RB_{START}$ else $RIV = N_{RB}(N_{RB}-L_{CRBs}+1) + (N_{RB}-1-RB_{START})$ with $N_{RB}$=6 as the number of RBs within the NB.

In some cases, some RIVs (e.g., 21 to 31) may be reserved or not be used in the conventional wireless communication network.

In another aspect, having a same set of DCI, for DCI format 6-0B (uplink), a 3-bit RIV may be used having a valid value from 0 to 7 and may be found in Table 5.2, with selected RAs having a length of one RB or two RBs. For DCI format 6-1B (downlink), a 1-bit RIV may be used having a value of 0 or 1 and may be found in Table 5.3, with selected RAs having a length of four RBs or six RBs.

In a previously proposed implementation without using an NB index, for DCI format 6-0A and DCI format 6-1A, the RIVs with 5 bits to 9 bits (e.g., a 5-bit RIV for BW=1.4 MHz, a 6-bit RIV for 3 MHz, a 7-bit RIV for 5 MHz, a 8-bit RIV for 10 MHz, or a 9-bit RIV for 15 MHz or 20 MHz), defined by $RIV=5RB_{start}+I_{CRB}$, may be used for flexible RA, which may be a same size/length of legacy RIV by restricting $RB_{start}$=0~($N_{RB}$−2) and length of 2~6 RBs with $I_{CRB}$=0~5; and $N_{RB}$ is the total number of RBs in the bandwidth. For DCI format 6-0B, RIV with 4 to 8 bits may be used for flexible RA, which is 1-bit larger than the size/length of legacy RIV: $RB_{start}$=0~($N_{RB}$−1) and length of 1 or 2 RBs with $L_{CRB}$=0, 1; and $RIV=2RB_{start}+L_{CRB}-1$.

For DCI format 6-1B, RIV with 4 to 8 bits may be used for flexible RA, which is 3-bit larger than the size/length of legacy RIV: $RB_{start}$=0~($N_{RB}$−2) and length of 4 or 6 RBs with $I_{CRB}$=0, 1; $RIV=2RB_{start}+I_{CRB}$.

However, when using such an implementation, for example, the conditions or triggers (e.g., when and whether) to use new RIV (e.g., RIV for flexible RA) or legacy RIV may not be clear. For example, the UE may use a Radio Resource Control (RRC) connection to semi-statically switch between a new RIV and a legacy RIV. In an aspect, the modified RIV may be independent from an NB index, which is used in the legacy resource assignment indication for a MTC UE. In an aspect, the UE may not be able to use legacy NB hopping with an NB index offset indication, since legacy NB hopping (or frequency hopping) is based on an NB index. In another aspect, the UE may be unable to support RA with the length of one RB for DCI format 6-0A and/or DCI format 6-1A. In some cases, the UE may not support flexible RA for DCI format 6-0B and/or DCI format 6-1B within a legacy DCI size/length.

Therefore, in some aspects, to address challenges associated with the above implementation, more flexibility of the downlink/uplink RA mechanism may be used by a BL/CE UE that may assist in avoiding or at least significantly reducing the above-mentioned degradations on resource utilization. In an example, the UE may use or be configured to use a more flexible uplink/downlink resource allocation mechanism based on the specification of a newly released wireless communication standard (e.g., 3GPP Release 15). In an aspect, the UE may be backward capable to a legacy system (e.g., LTE) and take an approach so that the flexible uplink/downlink resource allocation mechanism may not lead to significantly increased UE complexity or energy consumption, as described further herein. In some cases, the downlink/uplink RA mechanism may not use an NB index indication, and may indicate the resource allocation over the whole system bandwidth. For example, a base station may indicate resource allocation for the whole system BW to the UE, and the base station and/or the UE may not use an NB index and/or an NB index indication for the resource allocation.

According to an aspect, a UE (e.g., UE 12) may use a modified RIV equation based on $RIV=N_{RB}(L_{CRBs}-1)+RB_{START}$ for DCI format 6-0A and/or DCI format 6-1A to achieve flexibility of the downlink/uplink RA, where $N_{RB}$ is the total RB number of the system BW instead of the total RB number of a NB. For example, when using DCI format 6-0A and/or 6-1A, the system may define one or more new RIVs with a same size (e.g., 5 bits) as the legacy RIV, and no extra bit(s) for RIV may be needed.

In a first scheme:

Define $RIV=N_{RB}I_{CRBs}+RB_{START}$, where $RB_{start}$=0~($N_{RB}$−1) with $N_{RB}$ as total RB number of BW and $I_{CRB}$=0~4 if limited to the same size of legacy RIV or $I_{CRB}$=0~5 if using 1 more bit than legacy RIV is allowed;

For uplink using DCI format 6-0A, length of RA is $L_{CRBs}=I_{CRBs}+1=1$~5 RB(s) with $RB_{start}+L_{CRBs}<N_{RB}$ if limited to the same size of legacy RIV or $L_{CRBs}=I_{CRBs}+1=1$~6 if using 1 more bit than legacy RIV is allowed; and For downlink using DCI format 6-1A, length of RA is $L_{CRBs}=I_{CRBs}+2=2$~6 RBs with $RB_{start}+L_{CRBs}<N_{RB}$ if limited to the same size of legacy RIV or $L_{CRBs}=I_{CRBs}+1=1$~6 if using 1 more bit than legacy RIV is allowed.

In a second scheme:
Define $RIV = N_{RBG}I_{CRBs} + RBG_{start}$, where $RBG_{start} = 0 \sim (N_{RBG}-1)$ with $$N_{RBG} = \left\lceil \frac{N_{RB}}{RBG_{size}} \right\rceil$$

as total number of RBGs and $I_{CRB} = 0 \sim 5$; $N_{RB}$ is the total RB number of system BW, and $BG_{size}$ is the RB number per RBG in the system BW;

For both DCI format 6-0A (uplink) and DCI format 6-1A (downlink), length of RA is $L_{CRBs} = I_{CRBs} + 1 = 1 \sim 6$ with $(RBG_{size}RBG_{start}) + L_{CRBs} \leq N_{RB}$.

In an example, when using the modified RIV(s) discussed above, NB hopping is supported, and the hopping offset other than the NB index offset may be defined. For example, if using the first scheme mentioned above, a hopping offset may be a RB offset. Considering the narrowbands with size of 6 RBs, the RB offset for hopping can be {0, 6 RBs, 12 RBs, . . . , $$\left\lfloor \frac{N_{RB}}{6} \right\rfloor RBs \}.$$

For example, if using the second scheme mentioned above, a hopping offset may be a RBG offset. In examples described herein, for allocations that use modified RIVs (also referred to herein as wideband allocations, as the allocations may include multiple NBs), frequency hopping can be supported based on parameters received and/or determined for narrowband allocations. For example, the resources of the wideband allocation can be analyzed in view of the available or configured narrowband allocations to determine whether to apply the frequency hopping. In addition, NB hopping parameters can be used to apply the frequency hopping, as described herein.

In another aspect, the UE may switch between a new RIV using a new format (e.g., to indicate the assignment without an NB index) and a legacy method (e.g., to indicate the NB index together with 5-bit RIV within the NB with RIV values from 0 to 20). In this case, for example, RRC signaling may be used to switch between a new RIV and a legacy method for DCI format 6-0A and/or DCI format 6-1A. In some cases, for UEs sending early data in a message (e.g., Msg3) before setting up the RRC connection, one or more of the UEs may use new RIV by default without RRC signaling.

According to another aspect, as shown in Table 6.1 of FIG. 6, the UE (e.g., UE 12) may use the NB index and RIVs of 0 through 20 for the legacy allocation, and define remaining RIV(s) with additional values (21 to 31) for DCI format 6-0A and/or DCI format 6-1A to extend the flexible downlink/uplink resource allocation for each NB, with various system BWs. The legacy RIV of 0 through 20 and newly defined RIV of 21 through 31 may be switched between each other dynamically based on information (e.g., DCI) on a physical downlink control channel (PDCCH) and/or an MTC PDCCH (MPDCCH). In an aspect, MPDCCH may be one type of PDCCH designed for a bandwidth-reduced operation. In some examples, the system or UE 12 may define, identify, or determine one or more tables with RIV being equal to an integer value from 21 to 31, for the NB in BW with different NB location(s) and RBG size(s), but may keep same RIV size of 5 bits as the legacy DCI formats 6-0A and 6-1A.

Still referring to FIG. 6, the Table 6.1 is based on the NB index ($n_{NB}$), and may be compatible with a legacy NB hopping indication based on the NB index offset(s). In some other tables discussed herein, for example, the same RIV entry may have same length $L_{CRBs}$ of allocation but different starting RB index ($RB_{start}$). For example, when UE 12 hops from an NB (with misalignment) to another NB (without misalignment), the PRB allocation may keep the same length but shift the starting RB to keep the PRB allocation within the NB without misalignment, thereby not contaminating other RBGs. In some examples, for NB hopping based on the legacy NB index offset indication, the UE may use a same RIV value in the table corresponding to the indicated NB index ($n_{NB}$).

Figure 7:
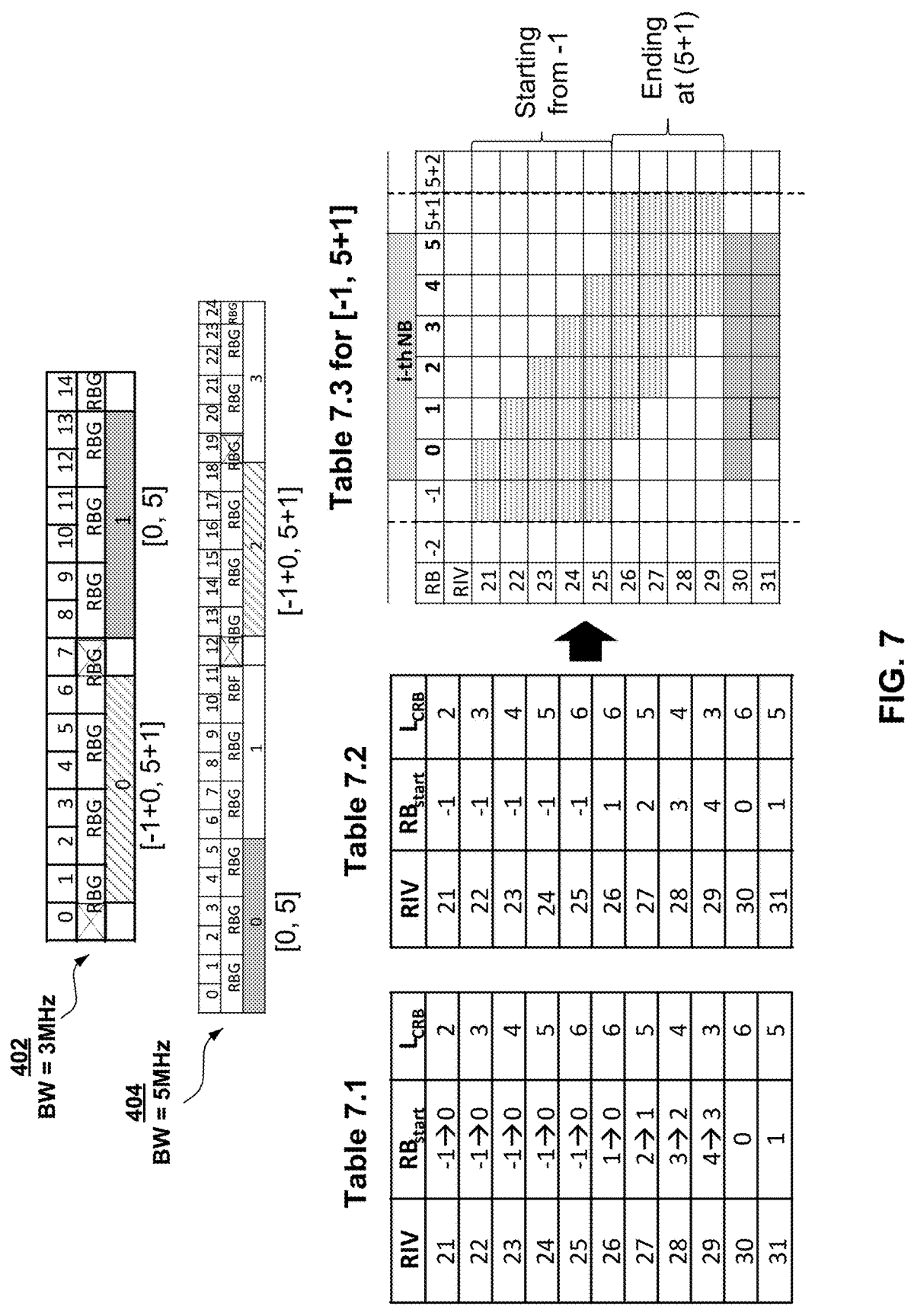

In an aspect, referring to FIG. 7, in a wireless communication network (e.g., a 5G NR network), a UE (e.g., UE 12) or base station (e.g., network entity 14 or 20) may be configured to perform RA using a RA scheme having a BW of 3 MHz (with frame structure 402) or 5 MHz (with frame structure 404). For example, the UE or base station may define the remaining RIVs with 21~31 values for DCI formats 6-0A and 6-1A, which are shown in the tables 7.1, 7.2, and 7.3, with RIV=21~31 for the NB in BW=3 MHz or 5 MHz. In this example, for BW=3 MHz, Table 7.1 may be used for $n_{NB}=1$ (no misalignment) and Table 7.2 (and/or Table 7.3) may be used for $n_{NB}=0$ (having misalignment). For BW=5 MHz, Table 7.1 may be used for $n_{NB}=0$, 1 (no misalignment) and Table 7.2 (and/or Table 7.3) may be used for $n_{NB}=2$, 3 (having misalignment). In some cases, for NB hopping based on the legacy NB index offset indication, the UE may use new RIV values (e.g., RIV=an integer between 21 and 31) in the table corresponding to the indicated $n_{NB}$ and BW.

Figure 8:
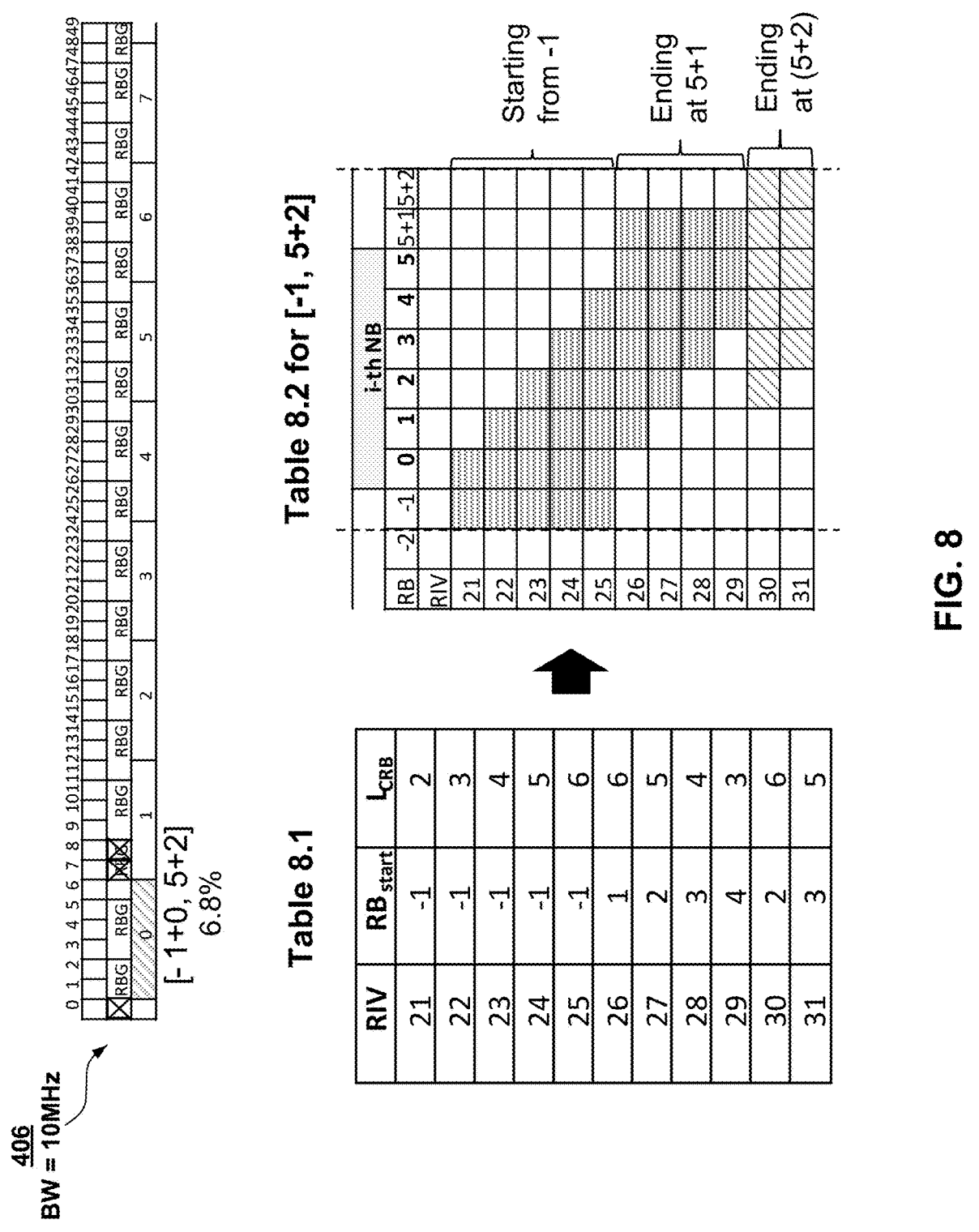

In an aspect, referring to FIG. 8, in a wireless communication network (e.g., a 5G NR network), a UE (e.g., UE 12) or base station (e.g., network entity 14 or 20) may be configured to perform RA using a RA scheme having a BW of 10 MHz (with frame structure 406). For example, the UE or base station may define the remaining RIV(s) with 21~31 values for DCI formats 6-0A and 6-1A, which are shown in the tables 8.1 and 8.2 with RIV=21~31 for the NB in BW=10 MHz. In this example, for BW=10 MHz, Table 8.1 and/or Table 8.2 may be used for $n_{NB}=0\sim7$. In some cases, for NB hopping based on the legacy NB index offset indication, the UE may use new RIV values (e.g., RIV=an integer between 21 and 31) in the table corresponding to the indicated $n_{NB}$ and BW.

In an aspect, referring to FIG. 9, in a wireless communication network (e.g., a 5G NR network), a UE (e.g., UE 12) or base station (e.g., network entity 14 or 20) may be configured to perform RA using a RA scheme having a BW of 20 MHz (with frame structure 410). For example, the UE or base station may define the remaining RIV(s) with 21~31 values for DCI formats 6-0A and 6-1A, which are shown in the tables 9.1, 9.2, 9.3, and/or 9.4 with RIV=21~31 for the NB in BW=20 MHz. In this example, for BW=20 MHz, Table 9.1 and/or Table 9.2 may be used for $n_{NB}=0$, 2, 4, 6, 8, 10, 12, 14, 16, and Table 9.3 and/or Table 9.4 may be used for $n_{NB}=1$, 3, 5, 7, 9, 11, 13, 15. In some cases, for NB hopping based on the legacy NB index offset indication, the UE may use new RIV values (e.g., RIV=an integer between 21 and 31) in the table corresponding to the indicated $n_{NB}$ and BW.

Figure 10:
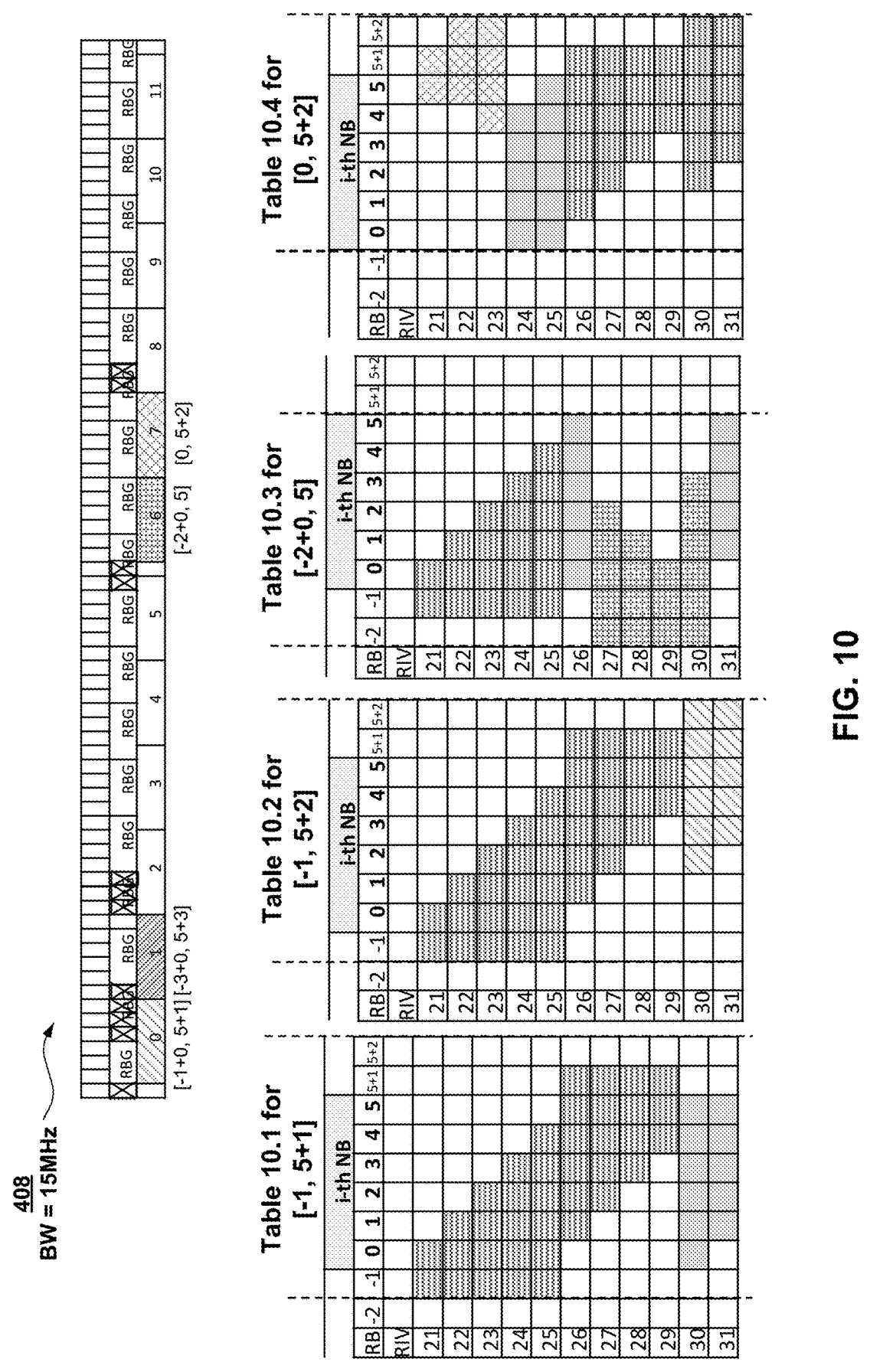

In an aspect, referring to FIG. 10, in a wireless communication network (e.g., a 5G NR network), a UE (e.g., UE 12) or base station (e.g., network entity 14 or 20) may be configured to perform RA using a RA scheme having a BW of 15 MHz (with frame structure 408). For example, the UE or base station may define the remaining RIV(s) with 21~31 values for DCI formats 6-0A and 6-1A, which are shown in the tables 10.1, 10.2, 10.3, and/or 10.4, with RIV=21~31 for the NB in BW=15 MHz. In this example, for BW=15 MHz, Table 10.1 may be used for $n_{NB}$=0, 2, 4, Table 10.2 may be used for $n_{NB}$=1, 3, 5, Table 10.3 may be used for $n_{NB}$=6, 8, 10, and Table 10.4 may be used for $n_{NB}$=7, 9, 11. In some cases, for NB hopping, the UE may use the legacy NB index offset indication, and/or use new RIV values (e.g., RIV=an integer between 21 and 31) in the table corresponding to the indicated $n_{NB}$ and BW.

Figure 11:
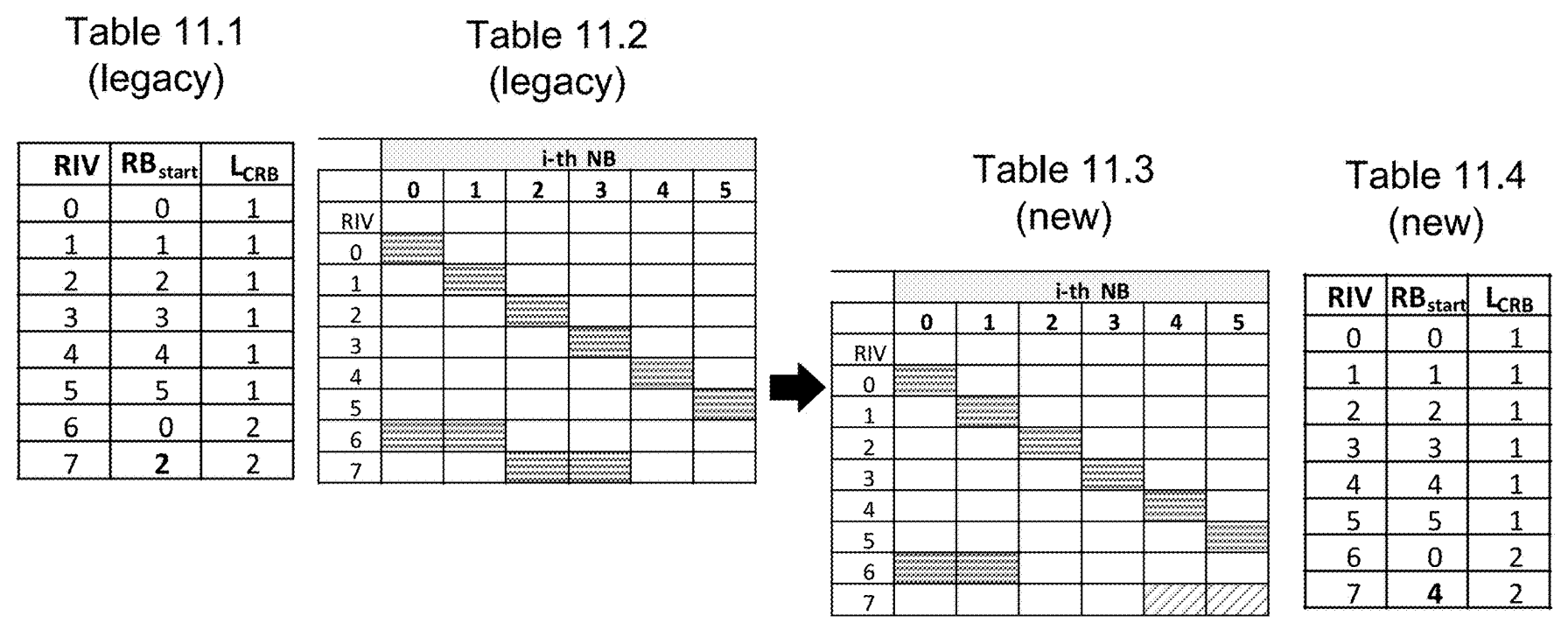

In an aspect, referring to FIG. 11, in a wireless communication network (e.g., a 5G NR network), a UE (e.g., UE 12) or base station (e.g., network entity 14 or 20) may be configured to perform RA using a RA scheme for DCI format 6-0B. In an aspect, for uplink RA, the RA adjacent to the edge RBs may reduce the segmentations of the spectrum. For example, Table 11.1 and/or Table 11.2 may be used by a legacy or existing system, UE, or RIV, and Table 11.3 and/or Table 11.4 may be used to enable the allocation with two RBs next to the adjacent subband, as discussed herein. In this example, for RIV=7, $RB_{start}$ changes from the second RB to the fourth RB, or from a $RB_{start}$ value of 2 to a value of 4, as shown in FIG. 11. In another aspect, the UE may switch between a new RIV and a legacy RIV. For example, the UE may use RRC signaling to switch between a new RIV and a legacy RIV for PUSCH. In another example, for UEs sending early data in a message (e.g., Msg3) before setting up an RRC connection, the UE may use new RIV by default without RRC signaling.

In another aspect, referring to FIG. 12, in a wireless communication network (e.g., a 5G NR network), a UE (e.g., UE 12) or base station (e.g., network entity 14 or 20) may be configured to perform RA using at least an NB offset indication without changing RIVs in DCI. For example, the UE or base station may use RRC signaling to indicate the NB offset for NB in a BW (e.g., 3 MHz, 5 MHz, 10 MHz, 15 MHz, or 20 MHz) with different NB location(s) and RBG size(s), and may use or reuse legacy RIV but shift the NB location by the indicated $NB_{offset}$. In an example, as shown in Table 12.1, the UE or base station may use a 1-bit indication to indicate no change or change the NB location to align with one side (left or right, start or end) of a RBG boundary. In another example, as shown in Table 12.2, the UE or base station may use a 2-bit indication to indicate the selected value of $NB_{offset}$ among a maximum four possible values for different NB(s) in each BW.

In some aspects, in legacy eMTC, the UE (e.g., UE 12) may perform retuning (e.g. in the uplink) when the resource allocation moves from one NB to a different NB. In an example, during retuning, the UE may be allowed to not transmit signals. In other words, the UE may delay or stop signal transmissions, for example, when the UE is retuning the local oscillator (LO). In this case, the UE RF front end is six-PRB wide (e.g., for an NB). In some cases, the resource allocation may be performed outside the NB or six PRBs. In an example, to perform retuning in a 10 MHz BW, the UE moving from "PRB-1" to "PRB 7" may need to retune, since the separation is or may require nine PRBs.

If the resource allocation being performed outside an NB, in a first example, the UE may retune only where the indicated NB changes. In this example, UEs that support the feature (retuning only where the indicated NB changes) may need a slightly wider RF BW (e.g., nine PRBs) than a regular RF BW (e.g., six PRBs).

In a second example, whenever the UE transmits PUSCH in between two NBs, and the resource allocation changes, the UE may be allowed to retune.

In a third example, the UE may determine, identify, signal, or indicate whether the UE supports the feature in the first example or the feature in the second example, which may be based on the UE capability or implementations such as RF designs. In case the UE supports the feature in the second example, then the UE may signal or indicate a retuning time that the UE takes to retune from a first RA to a second RA in the same NB index.

For instance, the UE may take two SC-FDMA symbols to retune between different NBs (e.g., $NB_0$ and $NB_1$). In another example, it may take the UE one SC-FDMA symbol to retune between −1 and +7 in the NB index.

Referring to FIG. 13, FIG. 14A, FIG. 14B, and/or FIG. 14C, NB hopping and hopping distance are used or considered. For example, after hopping, the allocated RBs after hopping may be sparsely distributed in the system BW compared to the allocated RBs before hopping, and the hopping distance(s) may be predetermined (e.g., as much as possible). In some examples, the sparsely distribution may be important for the allocation with small size $L_{CRB}$. In an aspect, for downlink transmissions (e.g., physical downlink shared channel (PDSCH) coverage enhancement (CE) mode A), the legacy NB index indication may be reused and defines the reserved RIVs of 21~31 in Tables 13.1, 13.2, and/or 14.2~14.8 for different BWs to support flexible RA and backward compatible with NB hopping.

In some examples, similar to the allocation in LTE, the RB index may be in the range of 0~($N_{RB}$−1), where $N_{RB}$ is the total number of RBs in the system BW. If $RB_{start}$+$L_{CRBs} \geq N_{RB}$, the length of the allocated RB may be reduced (e.g., automatically reduced) but keep the same $RB_{start}$, e.g., $L'_{CRBs}=N_{RB}-RB_{start}-1$. Alternatively, the starting RB may be shifted but keep the same $L_{CRBs}$, e.g., $RB'_{start}=N_{RB}-L_{CRBs}-1$.

In some cases, different valid entries in DCI 6-1A may be used to help UE improve DCI detection performance, and/or UE behavior. For example, if a 1-bit RRC signaling, e.g., for flexible resource allocation of PDSCH CE mode A, is set 'off', the RIVs of 0~20 are valid. Otherwise, for example, if the 1-bit RRC signaling, e.g., for flexible resource allocation of PDSCH CE mode A, is set 'on', RIVs of 0~29 in Table 13.1 to Table 13.2 are valid entries for BW=3 MHz and/or 5 MHz, RIVs of 0~31 in Table 14.2 to Table 14.5 are valid entries for BW=15 MHz, RIVs of 0~29 in Table 14.6 are valid entries for BW=10 MHz, and RIVs of 0~31 in Table 14.7 and/or 14.8 are valid entries for BW=20 MHz.

In an aspect, referring to FIG. 13, similar to FIG. 7, in a wireless communication network (e.g., a 5G NR network), a UE (e.g., UE 12) or base station (e.g., network entity 14 or 20) may be configured to perform RA using a RA scheme having a BW of 3 MHz or 5 MHz with NB hopping. For example, the UE or base station may define the remaining RIVs entries with 21~31 values (e.g., for DCI formats 6-0A and/or 6-1A). In an example, Table 13.1 shows RBs in index [0, 5], and Table 13.1 shows RBs in in index [−1+0, 5+1], and the legacy NB index indication may be reused and defines the reserved RIVs of 21~31 in Tables 13.1 and 13.2, to support flexible RA and backward compatible with NB hopping, with RIV=21~31 for the NB in BW=3 MHz or 5 MHz. In an example, for BW=3 MHz, Table 13.2 may be used for $n_{NB}=\{0\}$, and Table 13.1 may be used for $n_{NB}=\{1\}$.

In another example, for BW=5 MHz, Table 13.1 may be used for $n_{NB}=\{0, 1\}$ and Table 13.2 may be used for $n_{NB}=\{2, 3\}$.

In an aspect, the valid entries in DCI 6-1A may be used to help the UE improve DCI detection performance. For example, if a 1-bit RRC signaling is off, the RIVs of 0~20 may be valid, otherwise, if the 1-bt RRC signaling is on (as shown in Table 13.1 and Table 13.2), RIVs of 0~29 may be valid entries for BW=3 MHz and/or 5 MHz.

In an aspect, referring to FIG. 14A, similar to FIG. 10, in a wireless communication network (e.g., a 5G NR network), a UE (e.g., UE 12) or base station (e.g., network entity 14 or 20) may be configured to perform RA using a RA scheme having a BW of 15 MHz with NB hopping. For example, the UE or base station may define the remaining RIV(s) entries with 21~31 values (e.g., for DCI formats 6-0A and/or 6-1A), which are shown in the Tables 14.2, 14.3, 14.4, and/or 10.5, with RIV=21~31 for the NB in BW=15 MHz. In this example, for BW=15 MHz, Table 14.2 may be used for $n_{NB}=0, 2, 4$, Table 14.3 may be used for $n_{NB}=1, 3, 5$, Table 14.4 may be used for $n_{NB}=6, 8, 10$, and Table 14.5 may be used for $n_{NB}=7, 9, 11$. In other words, for BW=15 MHz, Table 14.2 may be used for $n_{NB}=\{0, 2, 4\}$, Table 14.3 may be used for $n_{NB}=\{1, 3, 5\}$, Table 14.4 may be used for $n_{NB}=\{6, 8, 10\}$, and Table 14.5 may be used for $n_{NB}=\{7, 9, 11\}$.

In some examples, for NB hopping, the UE may use the legacy NB index offset indication, and/or use new RIV value(s) (e.g., RIV=21, 31, or an integer between 21 and 31) in the table corresponding to the indicated $n_{NB}$ and BW. In some cases, 11 entries instead of 9 entries for RIVs may be used for BW=15 MHz to increase the flexibility. In some examples, similar to the allocation in LTE, the RB index in 5G NR may be in the range of $0\sim(N_{RB}-1)$, where NB is the total number of RBs in the system BW. If $RB_{start}+L_{CRBs} \geq N_{RB}$, the length of the allocated RB may be reduced (e.g., automatically reduced) but keep the same $RB_{start}$, e.g., $L'_{CRBs}=N_{RB}-RB_{start}-1$. Alternatively, the starting RB may be shifted but keep the same $L_{CRBs}$, e.g., $RB'_{start}=N_{RB}-L_{CRBs}-1$.

In an aspect, referring to FIG. 14B, similar to FIG. 8, in a wireless communication network (e.g., a 5G NR network), a UE (e.g., UE 12) or base station (e.g., network entity 14 or 20) may be configured to perform RA using a RA scheme having a BW of 10 MHz with NB hopping. For example, the UE or base station may define the remaining RIV(s) entries with 21~31 values (e.g., for DCI formats 6-0A and/or 6-1A), which is shown in the Table 14.6 with RIV=21~31 for the NB in BW=10 MHz. In this example, for BW=10 MHz, Table 14.6 may be used for $n_{NB}=0\sim7$ (or $n_{NB}=\{0, 1, \ldots 7\}$). In some cases, for NB hopping based on the legacy NB index offset indication, the UE may use new RIV values (e.g., RIV=an integer between 21 and 31) in the table corresponding to the indicated $n_{NB}$ and BW.

In another aspect, referring to FIG. 14C, similar to FIG. 9, in a wireless communication network (e.g., a 5G NR network), a UE (e.g., UE 12) or base station (e.g., network entity 14 or 20) may be configured to perform RA using a RA scheme having a BW of 20 MHz with NB hopping. For example, the UE or base station may define the remaining RIV(s) entries with 21~31 values (e.g., for DCI formats 6-0A and/or 6-1A), which are shown in the Table 14.7 and/or Table 14.8, having RIV=21~31 for the NB in BW=20 MHz. In this example, for BW=20 MHz, Table 14.7 may be used for even $n_{NB}=\{0, 2, \ldots, 16\}$ and Table 14.8 may be used for odd $n_{NB}=\{1, 3, \ldots, 15\}$. In other words, Table 14.7 may be used for $n_{NB}=0, 2, 4, 6, 8, 10, 12, 14, 16$, and Table 14.8 may be used for $n_{NB}=1, 3, 5, 7, 9, 11, 13, 15$. In some cases, for NB hopping based on the legacy NB index offset indication, the UE may use new RIV values (e.g., RIV=an integer between 21 and 31) in the table corresponding to the indicated $n_{NB}$ and BW.

In an aspect, referring to FIG. 15, similar to FIG. 12, in a wireless communication network (e.g., a 5G NR network), a UE (e.g., UE 12) or base station (e.g., network entity 14 or 20) may be configured to perform RA using at least an NB offset indication (for example, for DCI formats 6-1B, and/or 6-1A and in another example, for DL PDSCH CE mode A and/or mode B). The NB offset consider the RBG boundary alignment in DL PDSCH resource allocation as well as the NB hopping distance. For example, the UE or base station may use RRC signaling to indicate the NB offset for NB in a BW (e.g., 3 MHz, 5 MHz, 10 MHz, 15 MHz, or 20 MHz) with different NB location(s) and RBG size(s), and may use or reuse legacy RIV but shift the NB location by the indicated $NB_{offset}$. In an example, as shown in Table 15, the UE or base station may use a 1-bit RRC on/off indication to indicate no change of NBs (e.g., $NB_{offset}=0$), or change the NB location by using the predefined NB offset based on the BW and $n_{NB}$. Note that in some cases, even 1-bit RRC on/off is set 'on', there is no NB offset (e.g., $NB_{offset}=0$), e.g., $n_{NB}=(N_{NB}/2), \ldots (N_{NB}-1)$ in $2^{nd}$ half BW in BW=3 MHz, $n_{NB}=0, \ldots, (N_{NB}/2-1)$ in 1st half BW in BW=5 MHz, $n_{NB}$ mod 2=1 in $2^{nd}$ half BW in BW=15 MHz, and $NB_{offset}=0$ for $n_{NB}$ mod 2=1 in BW=20 MHz.

Figure 16:
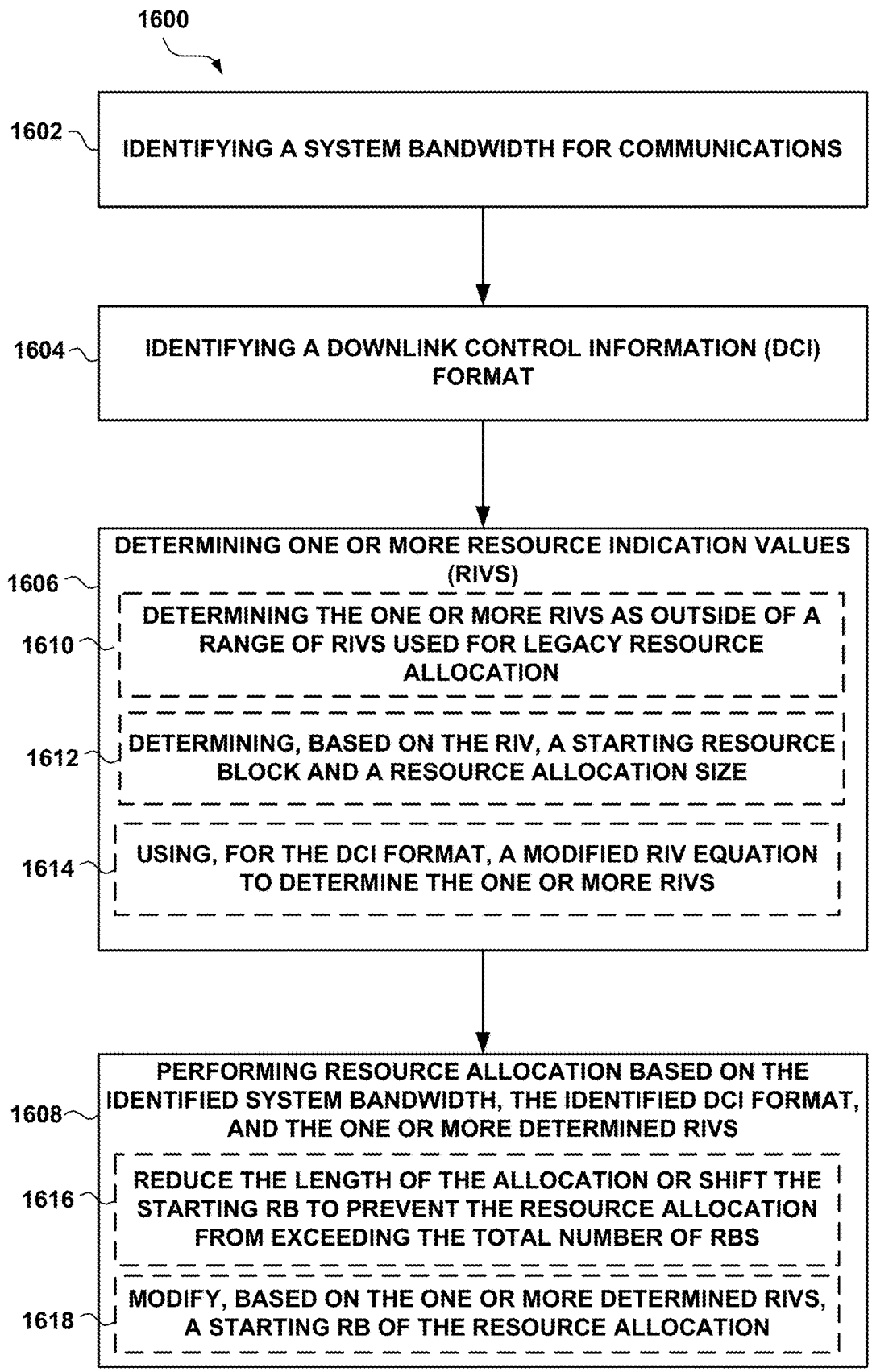
FIG. 16 is a flow chart of a first example method for performing resource allocation, according to one or more of the presently described aspects.

Referring to FIG. 16, in an operational aspect, a UE (e.g., an MTC UE), such as UE 12 in FIG. 1, or a base station (e.g., network entity 14 or 20) may perform one or more aspects of a method 1600 for managing one or more resource allocation procedures in a wireless communications system (e.g., a 4G or a 5G NR system). For example, one or more of the processors 103, memory 130, modem 108, transceiver 106, resource allocation component 40, bandwidth component 42, DCI format component 44, RIV component 46, NB index component 48, and/or NB hopping component 50 may be configured to perform one or more aspects of the method 1600.

In an aspect, at block 1602, the method 1600 may include identifying a system bandwidth for communications. In an aspect, for example, the resource allocation component 40, and/or bandwidth component 42, e.g., in conjunction with one or more of the processors 103, memory 130, modem 108, and/or transceiver 106, may be configured to identify or determine a system bandwidth for communications, as discussed herein.

In another aspect, at block 1604, the method 1600 may include identifying a downlink control information (DCI) format. In an aspect, for example, the resource allocation component 40, and/or DCI format component 44, e.g., in conjunction with one or more of the processors 103, memory 130, modem 108, and/or transceiver 106, may be configured to identify a DCI format, as discussed herein.

In an aspect, at block 1606, the method 1600 may include determining one or more resource indication values (RIVs). In an aspect, for example, the resource allocation component 40, and/or RIV component 46, e.g., in conjunction with one or more of the processors 103, memory 130, modem 108, and/or transceiver 106, may be configured to determine one or more RIVs, as discussed herein. As described, for example, this may include receiving the one or more RIVs in a configuration from the network.

In another aspect, at block 1608, the method 1600 may include performing resource allocation based on the identified system bandwidth, the identified DCI format, and the one or more determined RIVs. In an aspect, for example, the resource allocation component 40, bandwidth component 42, DCI format component 44, and/or RIV component 46, e.g., in conjunction with one or more of the processors 103, memory 130, modem 108, and/or transceiver 106, may be configured to perform one or more resource allocation operations based on the identified system bandwidth (at block 1602), the identified DCI format (at block 1604), and the one or more determined RIVs (at block 1606), as discussed herein. In an aspect, performing the resource allocation may include a UE 12 determining a resource allocation, as described herein, or a network entity 14 or network entity 20 generating a resource allocation and/or related parameters for a UE 12. In addition, starting resource block indices of the starting resource block can align with a resource block group boundary of a narrowband and/or ending resource block indices, as defined as an index of the starting resource block plus the resource allocation size, align with a resource block group boundary of the narrowband.

In an aspect, the method 1600 may optionally include identifying a NB index offset indication, and performing NB hopping based on the NB index offset indication. In an aspect, for example, the resource allocation component 40, NB index component 48, and/or NB hopping component 50, e.g., in conjunction with one or more of the processors 103, memory 130, modem 108, and/or transceiver 106, may be configured to identify a NB index offset indication, and perform NB hopping based on the NB index offset indication, as discussed herein.

In another aspect, the method 1600 may optionally include identifying an indication of resource allocation for the system bandwidth, and performing NB hopping based on the identified indication. In an aspect, for example, the resource allocation component 40, bandwidth component 42, and/or NB hopping component 50, e.g., in conjunction with one or more of the processors 103, memory 130, modem 108, and/or transceiver 106, may be configured to identify an indication of resource allocation for the system bandwidth, and perform NB hopping based on the identified indication, as discussed herein.

In an aspect, in determining the one or more RIVs at block 1606, optionally at block 1610, the one or more RIVs can be determined as outside of a range of RIVs used for legacy resource allocation. In an aspect, for example, the resource allocation component 40, and/or RIV component 46, e.g., in conjunction with one or more of the processors 103, memory 130, modem 108, and/or transceiver 106, may be configured to determine the one or more RIVs as outside of the range of RIVs used for legacy resource allocation. As described, for example, legacy resource allocation for legacy communication technologies, such as LTE, can use RIV 0-20, thus for flexible resource allocations, RIVs 21-31 can be used, where the values 0-31 can be represented by a number of bits in a RIV field defined or otherwise received in a network configuration. In this regard, where RIV 21-31 are encountered, this can be determined to correspond to a flexible resource allocation, as defined herein (e.g., and/or as shown in examples in FIGS. 7-10, 13, and 14).

In an aspect, in determining the one or more RIVs at block 1606, optionally at block 1612, a starting resource block and resource allocation size can be determined based on the RIV. In an aspect, for example, the resource allocation component 40, and/or RIV component 46, e.g., in conjunction with one or more of the processors 103, memory 130, modem 108, and/or transceiver 106, may be configured to determine, based on the RIV, the starting resource block and resource allocation size. In one example, the starting RB and allocation size can be determined based on the RIV and a corresponding table, as described above (e.g., one or more tables shown in examples in FIGS. 7-10, 13, and 14). For example, the RIV and/or the table may be configured by the network. In one example, the UE 12 may receive or otherwise know the table from a configuration, and may receive the RIV and/or related information in RRC signaling from a base station.

In an aspect, in determining the one or more RIVs at block 1606, optionally at block 1614, a modified RIV equation can be used, for the DCI format, to determine the one or more RIVs. In an aspect, for example, the resource allocation component 40, and/or RIV component 46, e.g., in conjunction with one or more of the processors 103, memory 130, modem 108, and/or transceiver 106, may be configured to use, for the DCI format, the modified RIV equation to determine the one or more RIVs. For example, as described, a formula such as $RIV = N_{RB}(L_{CRBs}-1) + RB_{START}$ can be used, and/or according to the first scheme described above, $RIV = N_{RB} I_{CRBs} + RB_{START}$. In the latter example, for instance, length of RA is $L_{CRBs} = I_{CRBs} + 1 = 1\sim5$ RB(s) with $RB_{start} + L_{CRBs} < N_{RB}$ if limited to the same size of legacy RIV or $L_{CRBs} = I_{CRBs} + 1 = 1\sim6$ if using 1 more bit than legacy RIV is allowed. In another instance, length of RA is $L_{CRBs} = I_{CRBs} + 2 = 2\sim6$ RBs with $RB_{start} + L_{CRBs} < N_{RB}$ if limited to the same size of legacy RIV or $L_{CRBs} = I_{CRBs} + 1 = 1\sim6$ if using 1 more bit than legacy RIV is allowed. As described, this can allow for resource allocation where an allocation size at a certain starting RB may not otherwise be supported within a legacy DCI size/length.

In an aspect, in performing the resource allocation at block 1608, optionally at block 1616, the length of the allocation can be reduced or the starting RB can be shifted to prevent the resource allocation from exceeding the total number of RBs. In an aspect, for example, the resource allocation component 40, bandwidth component 42, DCI format component 44, and/or RIV component 46, e.g., in conjunction with one or more of the processors 103, memory 130, modem 108, and/or transceiver 106, may be configured to reduce the length of the allocation or shift the starting RB to prevent the resource allocation from exceeding the total number of RBs. For example, as described above, if $RB_{start} + L_{CRBs} \geq N_{RB}$, the length of the allocated RB may be reduced (e.g., automatically reduced) but keep the same $RB_{start}$, e.g., $L'_{CRBs} = N_{RB} - RB_{start} - 1$ so that the length of the allocated RB, $L_{CRBs}$, does not exceed $N_{RB} - RB_{start}$. Alternatively, the starting RB may be shifted but keep the same $L_{CRBs}$, e.g., $RB'_{start} = N_{RB} - L_{CRBs} - 1$. This can also allow for resource allocation where an allocation size at a certain starting RB may not otherwise be supported within a legacy DCI size/length.

In an aspect, in performing the resource allocation at block 1608, optionally at block 1618, a starting RB of the resource allocation can be modified based on the one or more determined RIVs. In an aspect, for example, the resource allocation component 40, bandwidth component 42, DCI format component 44, and/or RIV component 46, e.g., in conjunction with one or more of the processors 103, memory 130, modem 108, and/or transceiver 106, may be configured to modify, based on the one or more determined RIVs (e.g., for one or more specific values of RIV), the starting RB of the resource allocation. As described for example, in reference to FIG. 11, allocation with two RBs next to the adjacent subband can be enabled. In one specific example, for an RIV (e.g., RIV=7 in FIG. 11), $RB_{start}$ can be changed from the second RB to the fourth RB, or from a $RB_{start}$ value of 2 to a value of 4, as shown in FIG. 11, Table 11.4.

Figure 17:
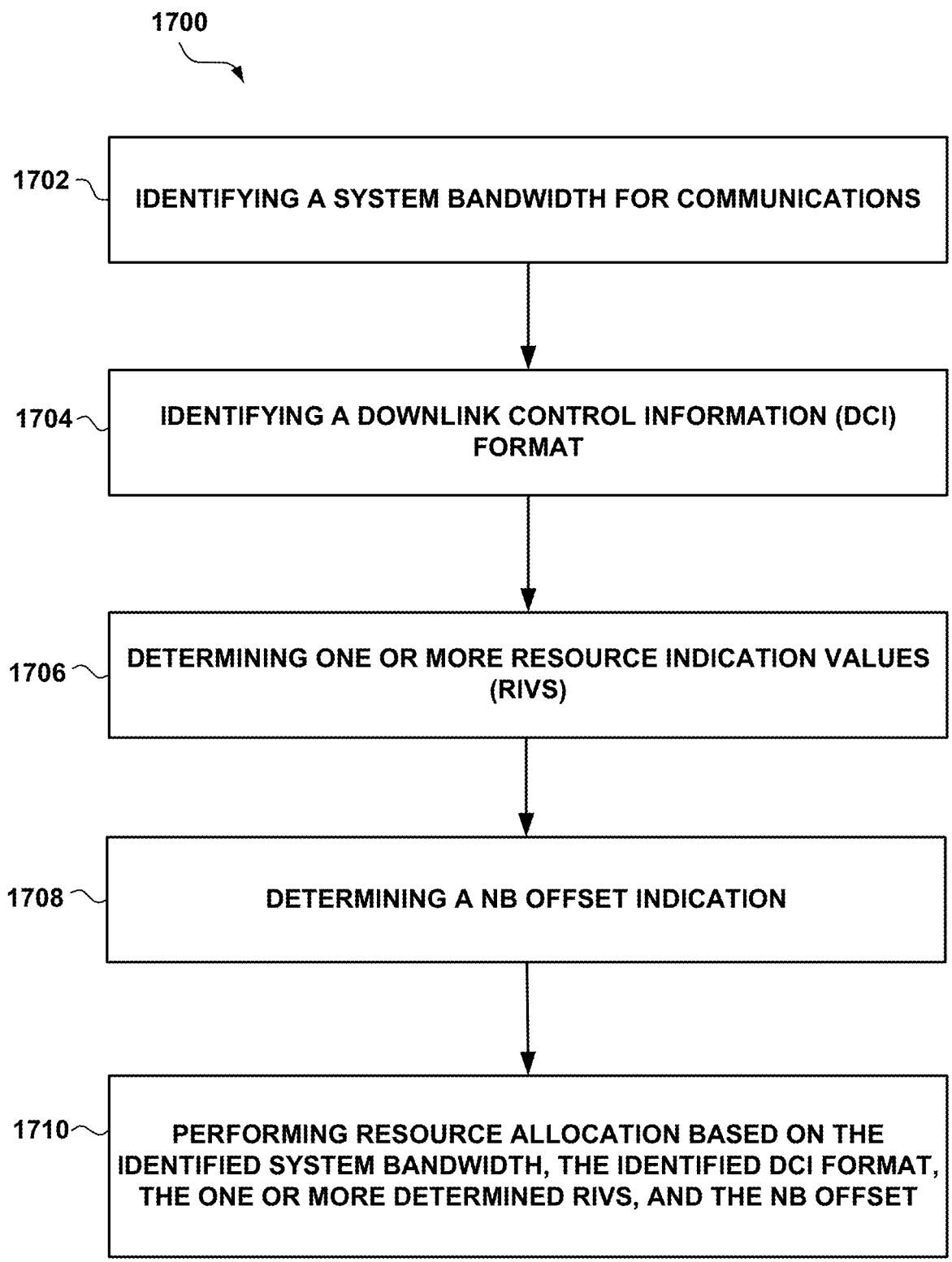
FIG. 17 is a flow chart of a second example method for performing resource allocation, according to one or more of the presently described aspects.

Referring to FIG. 17, in an operational aspect, a UE (e.g., an MTC UE), such as UE 12 in FIG. 1, or a base station (e.g., network entity 14 or 20) may perform one or more aspects of a method 1700 for managing one or more resource allocation procedures in a wireless communications system (e.g., a 4G or a 5G NR system). For example, one or more of the processors 103, memory 130, modem 108, transceiver 106, resource allocation component 40, bandwidth component 42, DCI format component 44, RIV component 46, NB index component 48, and/or NB hopping component 50 may be configured to perform one or more aspects of the method 1700.

In an aspect, at block 1702, the method 1700 may include identifying a system bandwidth for communications. In an aspect, for example, the resource allocation component 40, and/or bandwidth component 42, e.g., in conjunction with one or more of the processors 103, memory 130, modem 108, and/or transceiver 106, may be configured to identify or determine a system bandwidth for communications, as discussed herein.

In another aspect, at block 1704, the method 1700 may include identifying a downlink control information (DCI) format. In an aspect, for example, the resource allocation component 40, and/or DCI format component 44, e.g., in conjunction with one or more of the processors 103, memory 130, modem 108, and/or transceiver 106, may be configured to identify a DCI format, as discussed herein.

In an aspect, at block 1706, the method 1700 may include determining one or more resource indication values (RIVs). In an aspect, for example, the resource allocation component 40, and/or RIV component 46, e.g., in conjunction with one or more of the processors 103, memory 130, modem 108, and/or transceiver 106, may be configured to determine one or more RIVs, as discussed herein. As described, for example, this may include receiving the one or more RIVs in a configuration from the network.

In an aspect, at block 1708, the method 1700 may include determining a NB offset indication. In an aspect, for example, the NB index component 48, e.g., in conjunction with one or more of the processors 103, memory 130, modem 108, and/or transceiver 106, may be configured to determine the NB offset indication. For example, as described, the NB offset can be indicated or received using RRC signaling. In addition, the UE 12 can receive a table indicating a NB offset for one or more specific BWs (e.g., 3 MHz, 5 MHz, 10 MHz, 15 MHz, or 20 MHz) with different NB location(s) and/or RBG size(s). For example, the table can map NB offsets for each of multiple NBs in each of the multiple specific BWs (e.g., as shown and described with reference to FIGS. 12 and 15). In this regard, as described further herein, the resource allocation may be determined based on using (or reusing) legacy RIV and shifting the NB location by the indicated $NB_{offset}$, and based on receiving the NB offset indication. In an example, as shown in Table 12.1, a 1-bit indication can be used to indicate no change or change the NB location to align with one side (left or right, start or end) of a RBG boundary. In another example, as shown in Table 12.2, the UE or base station may use a 2-bit indication to indicate the selected value of $NB_{offset}$ among a maximum four possible values for different NB(s) in each BW.

In another aspect, at block 1710, the method 1700 may include performing resource allocation based on the identified system bandwidth, the identified DCI format, the one or more determined RIVs, and the NB offset. In an aspect, for example, the resource allocation component 40, bandwidth component 42, DCI format component 44, and/or RIV component 46, e.g., in conjunction with one or more of the processors 103, memory 130, modem 108, and/or transceiver 106, may be configured to perform one or more resource allocation operations based on the identified system bandwidth (at block 1702), the identified DCI format (at block 1704), the one or more determined RIVs (at block 1706), and the NB offset (at Block 1708), as discussed herein. As described, the resource allocation can be determined from a table based on a RIV and/or the NB location of the resource allocation can be offset based on a received $NB_{offset}$.

Figure 18:
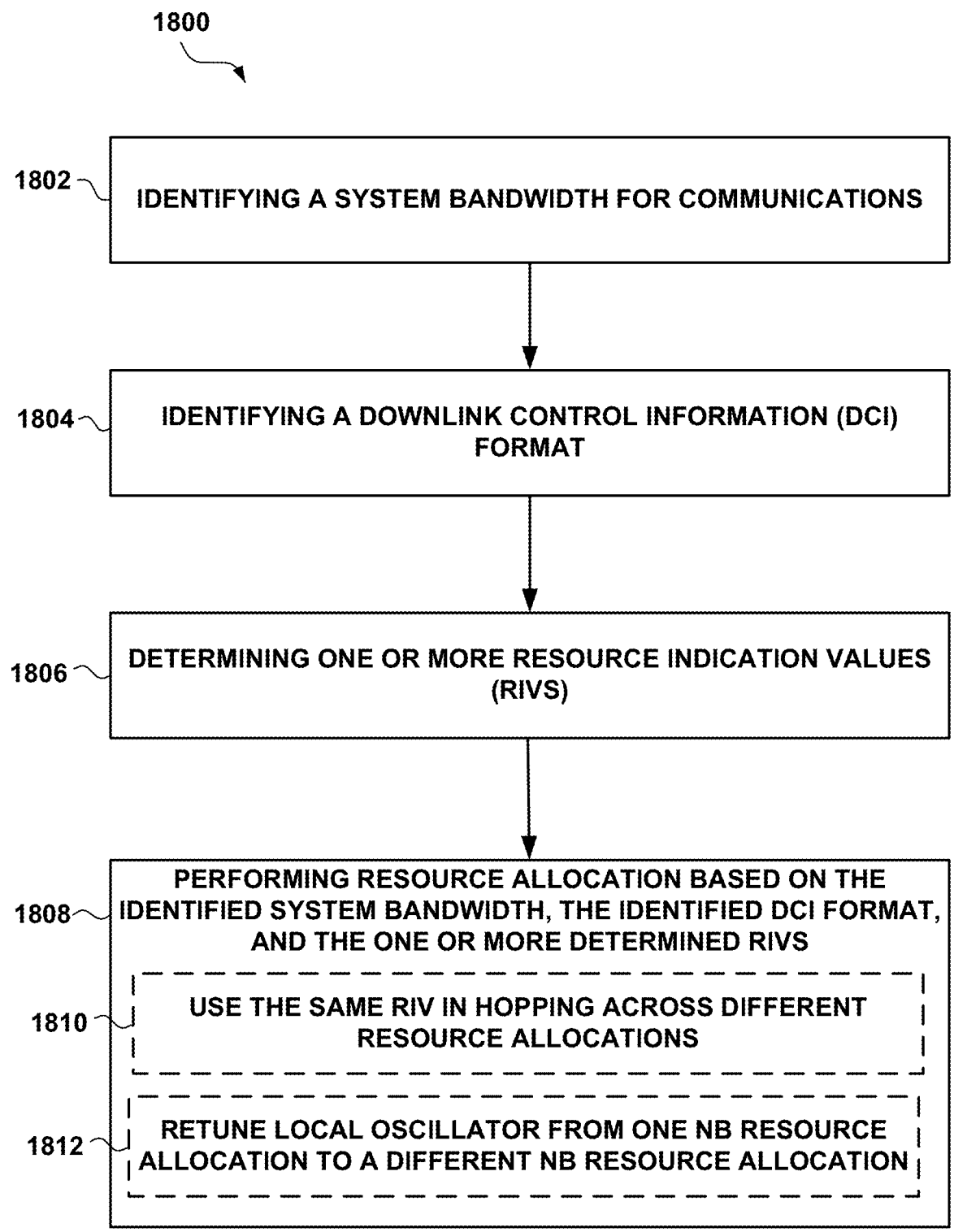
FIG. 18 is a flow chart of a third example method for performing resource allocation, according to one or more of the presently described aspects.

Referring to FIG. 18, in an operational aspect, a UE (e.g., an MTC UE), such as UE 12 in FIG. 1, or a base station (e.g., network entity 14 or 20) may perform one or more aspects of a method 1800 for managing one or more resource allocation procedures in a wireless communications system (e.g., a 4G or a 5G NR system). For example, one or more of the processors 103, memory 130, modem 108, transceiver 106, resource allocation component 40, bandwidth component 42, DCI format component 44, RIV component 46, NB index component 48, and/or NB hopping component 50 may be configured to perform one or more aspects of the method 1800.

In an aspect, at block 1802, the method 1800 may include identifying a system bandwidth for communications. In an aspect, for example, the resource allocation component 40, and/or bandwidth component 42, e.g., in conjunction with one or more of the processors 103, memory 130, modem 108, and/or transceiver 106, may be configured to identify or determine a system bandwidth for communications, as discussed herein.

In another aspect, at block 1804, the method 1800 may include identifying a downlink control information (DCI) format. In an aspect, for example, the resource allocation component 40, and/or DCI format component 44, e.g., in conjunction with one or more of the processors 103, memory 130, modem 108, and/or transceiver 106, may be configured to identify a DCI format, as discussed herein.

In an aspect, at block 1806, the method 1800 may include determining one or more resource indication values (RIVs). In an aspect, for example, the resource allocation component 40, and/or RIV component 46, e.g., in conjunction with one or more of the processors 103, memory 130, modem 108, and/or transceiver 106, may be configured to determine one or more RIVs, as discussed herein. As described, for example, this may include receiving the one or more RIVs in a configuration from the network.

In another aspect, at block 1808, the method 1800 may include performing resource allocation based on the identified system bandwidth, the identified DCI format, and the one or more determined RIVs. In an aspect, for example, the resource allocation component 40, bandwidth component 42, DCI format component 44, and/or RIV component 46, e.g., in conjunction with one or more of the processors 103, memory 130, modem 108, and/or transceiver 106, may be configured to perform one or more resource allocation operations based on the identified system bandwidth (at block 1802), the identified DCI format (at block 1804), and the one or more determined RIVs (at block 1806), as discussed herein.

In an aspect, in performing the resource allocation at block 1808, optionally at block 1810, the same RIV can be used in hopping across different resource allocations. In an aspect, for example, the resource allocation component 40, and/or NB hopping component 50, e.g., in conjunction with one or more of the processors 103, memory 130, modem 108, and/or transceiver 106, may be configured to use the same RIV in hopping across different resource allocations. For example, where legacy NB hopping is enabled, this may include using legacy hopping based on the RIV, where the RIV can be determined, as described above.

In an aspect, in performing the resource allocation at block 1808, optionally at block 1812, the local oscillator can be retuned from one NB resource allocation to a different NB resource allocation. In an aspect, for example, the resource allocation component 40, e.g., in conjunction with one or more of the processors 103, memory 130, modem 108, and/or transceiver 106, may be configured to retune the local oscillator (e.g., of a transceiver) from one NB resource allocation to a different NB resource allocation, as described above.

Figure 19:
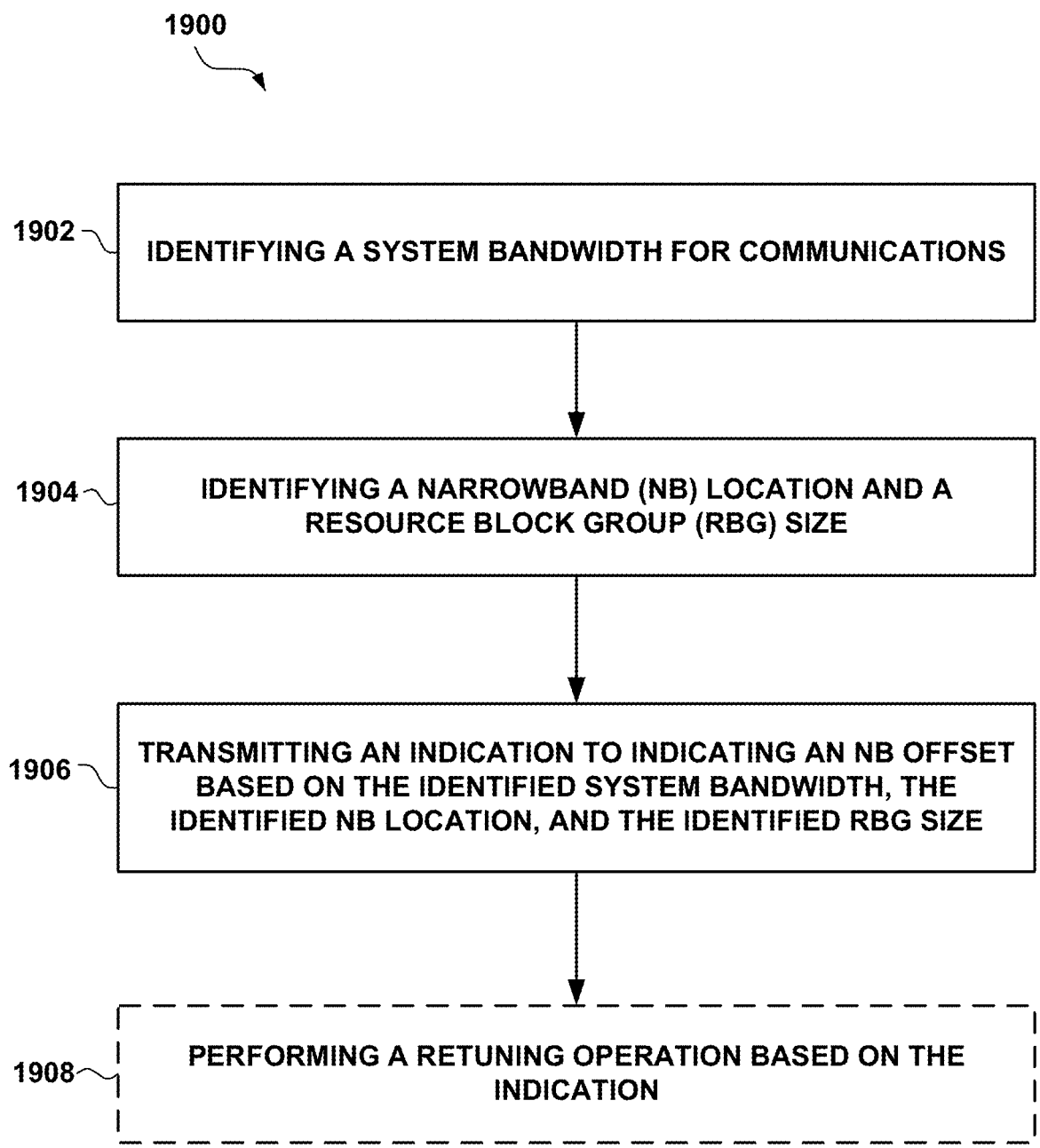
FIG. 19 is a flow chart of a fourth example method for performing resource allocation, according to one or more of the presently described aspects.

Referring to FIG. 19, in an operational aspect, a UE (e.g., an MTC UE), such as UE 12 in FIG. 1, or a base station (e.g., network entity 14 or 20), may perform one or more aspects of a method 1900 for managing one or more resource allocation procedures in a wireless communications system (e.g., a 4G or a 5G NR system). For example, one or more of the processors 103, memory 130, modem 108, transceiver 106, resource allocation component 40, bandwidth component 42, DCI format component 44, RIV component 46, NB index component 48, and/or NB hopping component 50 may be configured to perform one or more aspects of the method 1900.

In an aspect, at block 1902, the method 1900 may include identifying a system bandwidth for communications. In an aspect, for example, the resource allocation component 40, and/or bandwidth component 42, e.g., in conjunction with one or more of the processors 103, memory 130, modem 108, and/or transceiver 106, may be configured to identify or determine a system bandwidth for communications, as discussed herein.

In another aspect, at block 1904, the method 1900 may include identifying an NB location and a RBG size. In an aspect, for example, the resource allocation component 40, bandwidth component 42, and/or NB index component 48, e.g., in conjunction with one or more of the processors 103, memory 130, modem 108, and/or transceiver 106, may be configured to identify an NB location ($n_{NB}$) and/or a RBG size (e.g., 2, 3, or 4 RBs).

In an aspect, at block 1906, the method 1900 may include transmitting an indication to indicate an NB offset based on the identified system bandwidth, the identified NB location, and the identified RBG size. In an aspect, for example, the resource allocation component 40, bandwidth component 42, and/or NB index component 48, e.g., in conjunction with one or more of the processors 103, memory 130, modem 108, and/or transceiver 106, may be configured to transmit, via transceiver 106, an indication to indicate an NB offset based on the identified system bandwidth (at block 1902), the identified NB location (at block 1904), and the identified RBG size (at block 1904), as discussed herein.

In another aspect, at block 1908, the method 1900 may optionally include performing a retuning operation based on the indication. In an aspect, for example, the resource allocation component 40, e.g., in conjunction with one or more of the processors 103, memory 130, modem 108, and/or transceiver 106, may be configured to perform a retuning operation based on the indication (at block 1906), as discussed herein.

Figure 20:
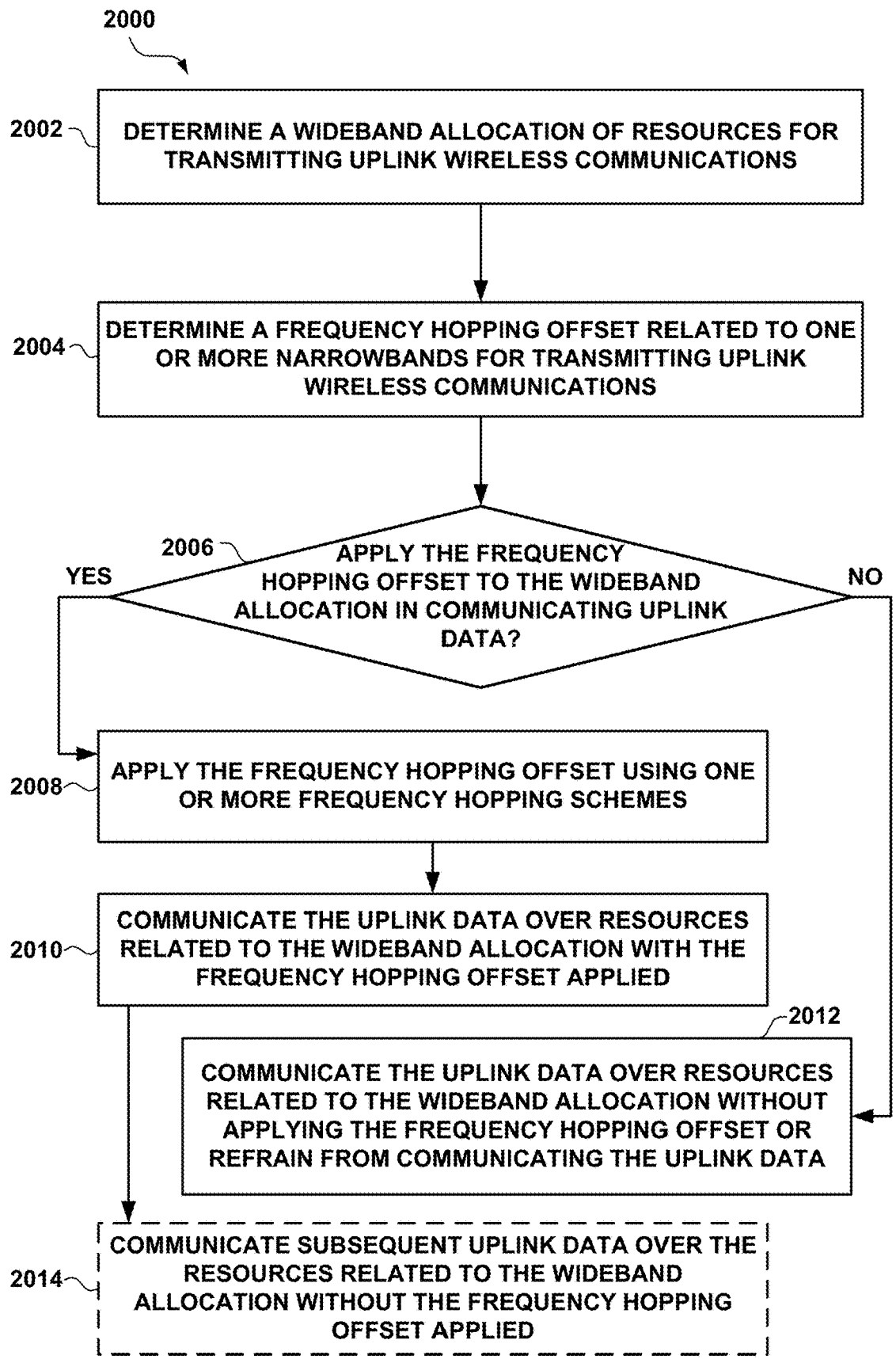
FIG. 20 is a flow chart of an example method for frequency hopping, according to one or more of the presently described aspects.

Referring to FIG. 20, in an operational aspect, a UE (e.g., an MTC UE), such as UE 12 in FIG. 1, or a base station (e.g., network entity 14 or 20) may perform one or more aspects of a method 2000 for managing one or more resource allocation procedures in a wireless communications system (e.g., a 4G or a 5G NR system). For example, one or more of the processors 103, memory 130, modem 108, transceiver 106, resource allocation component 40, bandwidth component 42, DCI format component 44, RIV component 46, NB index component 48, and/or NB hopping component 50 may be configured to perform one or more aspects of the method 2000.

In an aspect, at block 2002, the method 2000 may include determining a wideband allocation of resources for transmitting uplink wireless communications. In an aspect, for example, the resource allocation component 40, and/or bandwidth component 42, e.g., in conjunction with one or more of the processors 103, memory 130, modem 108, and/or transceiver 106, may be configured to determine the wideband allocation of resources for transmitting uplink wireless communications, as described herein. For example, the wideband allocation can include resource allocations across multiple narrowbands and can be referred to using a RIV over wideband, instead of a RIV within a narrowband. In this example, a base station 14, 20 can allocate a wideband allocation of resources to a UE 12 by specifying the RIV and/or other parameters, and the resource allocation component 40 can determine the wideband allocation based on receiving the RIV (e.g., in a configuration or other communication from the base station 14, 20). For example, the wideband allocation can correspond to multiple narrowband allocations of resources, as described herein, and the corresponding narrowband allocations can be determined based on the RIV. For example, the UE 12 can be configured to use wideband RIV for flexible starting point $RB_{START}$ over uplink system bandwidth $N_{RB}^{UL}$, such that for FDD, RIV $N_{RB}^{UL}(L_{CRBs}-1)+RB_{START}$ with the allocated size of $L_{CRBs}=1, 2, \ldots, 6$, and for TDD, RIV=$N_{RB}^{UL}(L_{CRBs}-2)+RB_{START}$ with $L_{CRBs}=2, 32, \ldots, 6$. In some cases, however, the frequency hopping using a narrowband offset for narrowband allocations may not be applied directly as the wideband RIV is not linked with the narrowband index, where the number of narrowbands and corresponding frequency locations are predefined for different bandwidths.

Additionally, in this regard, the resource allocation component 40 can determine narrowband allocations based on a configured set of resources, which may be configured based on a wireless communication standard, specified by a base station 14, 20 in a configuration to the UE 12, etc. For example, the narrowband allocations can be indicated by one or more parameters configured for the UE 12 (e.g., as NB indices and RIVs within the dedicated narrowband) or otherwise discernable based on the wireless communication standard or specification. The NB indices can have corresponding frequency locations on a system bandwidth allocated to the wireless communication system used by the base stations 14, 20 and/or UE 12 (e.g., 5G NR, UMTS LTE, etc.). Aspects described herein relate to applying the frequency hopping for the UE 12 with PUSCH flexible resource allocation by reusing the higher-layer indicated narrowband hopping offset, also referred to herein as $f_{NB,hop}^{PUSCH}$ and/or can include a value 1-16. The UE with indicated $f_{NB,hop}^{PUSCH}$ can hop, and/or determine the hopping offset, from the initial narrowband of $n_{NB}^{i_0}$ at subframe $i_0$ to the narrowband of $n_{NB}^{i}=(n_{NB}^{i_0}+f_{NB,hop}^{PUSCH}) \mod N_{NB}$, where $N_{NB}$ is the number of narrowbands in a system bandwidth of $N_{RB}^{UL}$.

In this regard, at block 2004, the method 2000 may include determining a frequency hopping offset related to one or more narrowbands for transmitting uplink wireless communications. In an aspect, for example, the resource allocation component 40, and/or WB hopping component 52, e.g., in conjunction with one or more of the processors 103, memory 130, modem 108, and/or transceiver 106, may be configured to determine the frequency hopping offset related to the one or more narrowbands for transmitting uplink wireless communications. For example, resource allocation component 40 can determine (e.g., from a configuration and/or based on a wireless communication standard) or can otherwise receive the frequency hopping offset (e.g., $f_{NB,hop}^{PUSCH}$) as an offset for one or more configured or configurable narrowbands that may be within the wideband allocation of resources (or within which the wideband allocation of resources may be allocated). For example, the frequency hopping offset may be configured for the UE 12 by a base station 14, 20 for one or more narrowbands (e.g., as configured specifically for the one or more narrowbands, as configured for all configurable narrowbands, etc.). In one example, the base station 14, 20 can configure the wideband allocation for the UE 12 based on configured narrowband allocations for the UE 12, as described, and can accordingly specify a frequency hopping offset for the multiple narrowbands in the configured narrowband allocations (e.g., as a single offset to apply to all narrowband indices, offsets for each narrowband index, etc.).

At block 2006, the method 2000 may include determining whether to apply the frequency hopping offset to the wideband allocation in communicating uplink data. In an aspect, for example, the resource allocation component 40, and/or WB hopping component 52, e.g., in conjunction with one or more of the processors 103, memory 130, modem 108, and/or transceiver 106, may be configured to determine whether to apply the frequency hopping offset (e.g., that is configured for the one or more narrowbands) to the wideband allocation in communicating the uplink data. For example, WB hopping component 52 can determine whether to apply the frequency hopping offset based on comparing one or more properties of the wideband allocation to properties of the narrowband allocation, such as a location of resources of the wideband allocation in a frequency spectrum as compared to frequency locations of resources of the narrowband allocations.

For example, in determining whether to apply the frequency hopping offset defined for the narrowband allocations to the wideband allocation, WB hopping component 52 can determine whether one or more of the following comparison cases exist for the wideband allocation and the narrowband allocations, where the wideband allocation can be defined in RB(s) {$RB_{START}$+l, l=0, ... $L_{CRBs}$−1} that may be fully or partially inside or outside the narrowband allocation(s): Case 1: RB(s) of the wideband allocation is/are fully inside one or two (or more) narrowband allocations; Case 2: RB(s) of the wideband allocation is/are partially inside one or two (or more) narrowband allocations; Case 2(a): the starting PRB(s) including the starting point $RB_{START}$ is(are) the PRB(s) outside the narrowband allocation(s), but the ending PRB(s) including the ending point ($RB_{START}$+$L_{CRBs}$−1) is(are) the PRB(s) inside a narrowband allocation; Case 2(b): the starting PRB(s) including the starting point $RB_{START}$ is(are) inside a narrowband allocation, but the ending PRB(s) including the ending point ($RB_{START}$+$L_{CRBs}$−1) is(are) the PRB(s) outside the narrowband allocation(s); Case 2(c): the middle part of the allocated PRB(s) is outside the narrowband allocation(s) but the starting/ending parts including the starting point $RB_{START}$ and the ending point ($RB_{START}$+$L_{CRBs}$−1) are inside different narrowband allocations (e.g., the allocation that include a center PRB over the wideband not within any narrowbands for system bandwidth=3 MHz, 5 MHz, or 15 MHz); Case 3: the allocated PRB(s) is (are) totally outside the narrowband allocation(s) (e.g., the allocation includes only one or two edge PRBs or a center RB outside the narrowbands).

In an example, to keep compatible with UEs using narrowband allocations in the same narrowband allocation(s) after hopping, at least some of the above cases can be disabled for hopping, and in this example, determining whether to apply frequency hopping at block 2006 can include determining (e.g., by WB hopping component 52) whether the wideband allocation satisfies a certain one of the above cases with respect to the one or more narrowband allocations. In a specific example, WB hopping component 52 can determine to apply the frequency hopping for Case 1 above (e.g., based on determining that the wideband allocation is within the one or more narrowband allocations) but can disable the frequency hopping for other cases, e.g., Case 2a/2b/2c and Case 3. In another specific example, WB hopping component 52 can determine to apply the frequency hopping for Case 1, Case 2a, and Case 2b above, etc. but disable the frequency hopping for other cases, e.g., Case 2c and Case 3. In these examples, WB hopping component 52 can determine which case applies to the wideband allocation. In addition, in an example, when the hopping leads to wrap-around (e.g., where the resource allocation is split into some PRB(s) on one edge and some PRB(s) on the other edge of the system bandwidth) or transmission in the PRB(s) outside the narrowband, the PUSCH transmission on that subframe is dropped (e.g., resource allocation component 40, and/or WB hopping component 52, e.g., in conjunction with one or more of the processors 103, memory 130, modem 108, and/or transceiver 106 can determine to drop the PUSCH transmission in this case).

For example, where WB hopping component 52 determines to apply frequency hopping to Case 1 only, but not to Case 2(a), 2(b), 2(c) and Case 3, WB hopping component 52 can find corresponding value cases when an initial narrowband of the allocated wideband resources is valid. For example, WB hopping component 52 can determine the valid cases when the initial narrowband $n_{NB}^{i_0}$ of the allocated RB(s) in initial subframe $i_0$ is valid. Assuming the allocated RBs are {$RB_{START}$+1, $RB_{START}$=0, ..., $N_{RB}^{UL}$−1, l=0, ..., $L_{CRBs}$−1} with $L_{CRBs}$=1, ..., 6 for FDD $L_{CRBs}$=2, ..., 6 for TDD and $L_{CRBs}$≤$N_{RB}^{UL}$−$RB_{START}$, WB hopping component 52 can determine the valid cases for even and odd system bandwidth separately, considering there is a center RB outside narrowbands only if system bandwidth has odd number of RBs.

If the system bandwidth has an even number of RBs, such as $N_{RB}^{UL}$ mod 2=0, The corresponding narrowband index where the allocated RB with index of ($RB_{START}$+1) is located is calculated as $$n_{NB,i} = \begin{cases} \left\lfloor \dfrac{RB_{START}+l-l_e}{6} \right\rfloor & \text{if } 0 \leq \left\lfloor \dfrac{RB_{START}+l-l_e}{6} \right\rfloor < N_{NB} \\ \text{invalid} & \text{otherwise} \end{cases},$$

where $$l_e = \left\lfloor \dfrac{N_{RB}^{UL}}{2} \right\rfloor - \dfrac{6N_{NB}}{2}$$

is the number of the edge RB outside the narrowbands with $N_{NB}$ as the number of narrowbands in system bandwidth of $N_{RB}^{UL}$.

The initial NB $n_{NB}^{i_0}$ of the allocated RB(s) in initial subframe $i_0$ is set as $$n_{NB}^{i_0} = \begin{cases} n_{NB,l=0} & \text{if } n_{NB,l=0} \text{ is valid and } n_{NB,l=L_{CRBs}-1} \text{ is valid} \\ \text{invalid} & \text{otherwise} \end{cases},$$

where $n_{NB,l=0}$ is the narrowband in which the starting PRB of $RB_{START}$ is located and $n_{NB,l=L_{CRBs}-1}$ is the narrowband in which the ending PRB of ($RB_{START}$+$L_{CRBs}$−1) is located.

If both $n_{NB,l=a}$ nd $n_{NB,l=L_{CRBs}-1}$ are valid (corresponding to Case 1), it can be regarded as a valid initial NB $n_{NB}^{i_0}$, using the narrowband index that the starting PRB located in the absolute subframe number $i_0$ as $$n_{NB}^{i_0} = \left\lfloor \frac{RB_{START} - l_e}{6} \right\rfloor;$$

otherwise for other cases (corresponding to the Case 2(a), 2(b) and Case 3), the initial NB $n_{NB}^{i_0}$ is set invalid and not qualified to support frequency hopping. Note that if the system bandwidth has an even number of RBs, there is no Case 2(c).

If the system bandwidth has an odd number of RBs, such as $N_{RB}^{UL} \bmod 2=1$ The corresponding narrowband index where the allocated RB with index of ($RB_{START}$+1) is located/calculated as $$n_{NB,l} = \begin{cases} \left\lfloor \frac{RB_{START} + l - l_e}{6} \right\rfloor & \text{if } RB_{START} + l < \left\lfloor \frac{N_{RB}^{UL}}{2} \right\rfloor \text{ and } 0 \leq \left\lfloor \frac{RB_{START} + l - l_e}{6} \right\rfloor < \frac{N_{NB}}{2} \\ \left\lfloor \frac{RB_{START} + l - l_e - 1}{6} \right\rfloor & \text{if } RB_{START} + l \geq \left\lfloor \frac{N_{RB}^{UL}}{2} \right\rfloor \text{ and } \frac{N_{NB}}{2} \leq \frac{RB_{START} + l - l_e - 1}{6} < N_{NB} \\ \text{invalid} & \text{otherwise} \end{cases}$$

The initial NB $n_{NB}^{i_0}$ of the allocated RB(s) in initial subframe $i_0$ is set as $$n_{NB}^{i_0} = \begin{cases} \text{invalid} & \text{if } n_{NB,l=0} = \frac{N_{NB}}{2} - 1 \text{ and } n_{NB,l=L_{CRBs}-1} = \frac{N_{NB}}{2} \\ n_{NB,l=0} & \text{else if } n_{NB,l=0} \text{ is valid and } n_{NB,l=L_{CRBs}-1} \text{ is valid} \\ \text{invalid} & \text{otherwise} \end{cases}$$

where $n_{NB,l=0}$ is the narrowband in which the starting PRB of $RB_{START}$ is located and $n_{NB,l=L_{CRBs}-1}$ is the narrowband in which the ending PRB of ($RB_{START}$+$L_{CRBs}$−1) is located.

If both $n_{NB,l=0}$ and $n_{NB,l=L_{CRBs}-1}$ are valid but they are the narrowbands adjacent to the center PRB, the center PRB outside narrowbands is allocated to the UE, the initial NB $n_{NB}^{i_0}$ is set invalid and not qualified to support frequency hopping (corresponding to the Case 2(c)). In other words, it is an error case if the frequency hopping enabled for PUSCH with the resource allocation including the center PRB not belonging to any narrowband. For other cases, if both $n_{NB,l=0}$ and $n_{NB,l=L_{CRBs}-1}$ are valid (corresponding to Case 1), it can be regarded as a valid initial NB $n_{NB}^{i_0}$ using the narrowband index that the starting PRB located in the absolute subframe number $i_0$ as $$n_{NB}^{(i_0)} = \left\lfloor \frac{RB_{START} - l_e}{6} \right\rfloor$$

if $RB_{START} < \lfloor N_{RB}^{UL}/2 \rfloor$ and $$n_{NB}^{(i_0)} = \left\lfloor \frac{RB_{START} - l_e - 1}{6} \right\rfloor \text{ if } RB_{START} > \lfloor N_{RB}^{UL}/2 \rfloor;$$

otherwise, for other cases (corresponding to Case 2(a), 2(b) and Case 3), the initial NB $n_{NB}^{i_0}$ is set invalid and not qualified to support frequency hopping.

In another example, where WB hopping component 52 determines to apply frequency hopping to Case 1, 2(a) and 2(b) but not to Case 2(c) and Case 3, WB hopping component 52 can find corresponding value cases when an initial narrowband of the allocated wideband resources is valid. For example, WB hopping component 52 can determine the valid cases when the initial narrowband $n_{NB}^{t_0}$ of the allocated RB(s) in initial subframe to is valid. Assuming the allocated RBs are $\{RB_{START}+1, RB_{START}=0, \ldots, N_{RB}^{UL}-1, l=0, \ldots, L_{CRBs}-1\}$ with $L_{CRBs}=1, \ldots, 6$ for FDD $L_{CRBs}=2, \ldots, 6$ for TDD and $L_{CRBs} \leq N_{RB}^{UL}-RB_{START}$, the valid cases are determined for even and odd system bandwidth separately, considering there is a center RB outside narrowbands only if system bandwidth has odd number of RBs.

If the system bandwidth has an even number of RBs, such as $N_{RB}^{UL} \bmod 2=0$, The corresponding narrowband index where the allocated RB with index of ($RB_{START}$+1) is located is calculated as $$n_{NB,l} = \begin{cases} \left\lfloor \frac{RB_{START} + l - l_e}{6} \right\rfloor & \text{if } 0 \leq \left\lfloor \frac{RB_{START} + l - l_e}{6} \right\rfloor < N_{NB} \\ \text{invalid} & \text{otherwise} \end{cases},$$

where $$l_e = \left\lfloor \frac{N_{RB}^{UL}}{2} \right\rfloor - \frac{6 N_{NB}}{2}$$

is the number of the edge RB outside the narrowbands with $N_{NB}$ as the number of narrowbands in system bandwidth of $N_{RB}^{UL}$.

The initial NB $n_{NB}^{i_0}$ of the allocated RB(s) in initial subframe $i_0$ is set as $$n_{NB}^{i_0} = \begin{cases} n_{NB,l=0} & \text{if } n_{NB,l=0} \text{ is valid} \\ n_{NB,l=L_{CRBs}-1} & \text{else if } n_{NB,l=L_{CRBs}-1} \text{ is valid} \\ \text{invalid} & \text{otherwise} \end{cases}$$

where $n_{NB,l=0}$ is the narrowband in which the starting PRB of $RB_{START}$ is located and $n_{NB,l=L_{CRBs}-1}$ is the narrowband in which the ending PRB of ($RB_{START}$+$L_{CRBs}$−1) is located.

If $n_{NB,l=0}$ is a valid narrowband index (corresponding to Case 1, Case 2(b)), it can be regarded as a valid initial NB $n_{NB}^{i_0}$; otherwise, if $n_{NB,l=L_{CRBs}-1}$ is a valid narrowband index (corresponding to Case 2(a)), it can be regarded as a valid initial NB $n_{NB}^{i_0}$. If both $n_{NB,l=0}$ and $n_{NB,l=L_{CRBs}-1}$ are invalid, i.e., the starting and ending RB is outside the narrowbands (corresponding to the Case 3), the initial NB $n_{NB}$ is set invalid and not qualified to support frequency hopping. Note that if the system bandwidth has an even number of RBs, there is no Case 2(c).

If the system bandwidth has an odd number of RBs, such as $N_{RB}^{UL} \bmod 2 = 1$ The corresponding narrowband index where the allocated RB with index of ($RB_{START}$+1) is located is calculated as $$n_{NB,l} = \begin{cases} \left\lfloor \frac{RB_{START} + l - l_e}{6} \right\rfloor & \text{if } RB_{START} + l < \left\lfloor \frac{N_{RB}^{UL}}{2} \right\rfloor \text{ and } 0 \leq \left\lfloor \frac{RB_{START} + l - l_e}{6} \right\rfloor < \frac{N_{NB}}{2} \\ \left\lfloor \frac{RB_{START} + l - l_e - 1}{6} \right\rfloor & \text{if } RB_{START} + l \geq \left\lfloor \frac{N_{RB}^{UL}}{2} \right\rfloor \text{ and } \frac{N_{NB}}{2} \leq \frac{RB_{START} + l - l_e - 1}{6} < N_{NB} \\ \text{invalid} & \text{otherwise} \end{cases}$$

The initial NB $n_{NB}$ of the allocated RB(s) in initial subframe $i_0$ is set as $$n_{NB}^{i_0} = \begin{cases} \text{invalid} & \text{if } n_{NB,l=0} = \frac{N_{NB}}{2} - 1 \text{ and } n_{NB,l=L_{CRBs}-1} = \frac{N_{NB}}{2} \\ n_{NB,l=0} & \text{else if } n_{NB,l=0} \text{ is valid} \\ n_{NB,l=L_{CRBs}-1} & \text{else if } n_{NB,l=L_{CRBs}-1} \text{ is valid} \\ \text{invalid} & \text{otherwise} \end{cases}$$

where $n_{NB,l=0}$ is the narrowband in which the starting PRB of $RB_{START}$ is located and $n_{NB,l=L_{CRBs}-1}$ is the narrowband in which the ending PRB of ($RB_{START}$+$L_{CRBs}$−1) is located.

If both $n_{NB,l=0}$ and $n_{NB,l=L_{CRBs}-1}$ are valid but they are the narrowbands adjacent to the center PRB, the center PRB outside narrowbands is allocated to the UE, the initial NB $n_{NB}^{i_0}$ is set invalid and not qualified to support frequency hopping (corresponding to the Case 2(c)). For other cases, if $n_{NB,l=0}$ is a valid narrowband index (corresponding to Case 1, Case 2(b)), it can be regarded as a valid initial NB $n_{NB}^{i_0}$; otherwise, if $n_{NB,l=L_{CRBs}-1}$ is a valid narrowband index (corresponding to Case 2(a)), it can be regarded as a valid initial NB $n_{NB}^{i_0}$. If both $n_{NB,l=0}$ and $n_{NB,l=L_{CRBs}-1}$ are invalid, i.e., the starting and ending RB is outside the narrowbands (corresponding to the Case 3), the initial NB $n_{NB}^{i_0}$ is set invalid and not qualified to support frequency hopping.

Where it is determined to apply the frequency hopping offset at block 2006, at block 2008 method 2000 includes applying the frequency hopping offset using one or more frequency hopping schemes. In an aspect, for example, the resource allocation component 40, and/or WB hopping component 52, e.g., in conjunction with one or more of the processors 103, memory 130, modem 108, and/or transceiver 106, may be configured to apply the frequency hopping offset using the one or more frequency hopping schemes. For example, WB hopping component 52 can apply the frequency hopping offset to the resources of the wideband allocation (e.g., to be consistent with frequency hopping defined for legacy narrowband allocations or otherwise). In one example, WB hopping component 52 can apply a scheme based on comparing the wideband allocation to the one or more narrowband applications, as described above (e.g., one scheme for Case 1, one scheme for Case 2(a), etc.). In one specific example, WB hopping component 52 can apply the frequency hopping offset to the resources of the wideband allocation in a first scheme where the frequency hopping offset of legacy narrowband allocations, $f_{NB,hop}^{PUSCH}$ can be reused. This scheme can be compatible with frequency hopping schemes based on narrowband frequency offset for the UEs with narrowband allocations. In this scheme, for example, for the valid cases qualified for frequency hopping, the initial narrowband $n_{NB}^{i_0}$ for the allocated resources in subframe $i_0$ is a valid narrowband index and the narrowband hopping offset $f_{NB,hop}^{PUSCH}$ can be reused (e.g., by WB hopping component 52) to find the narrowband index in subframe i after hopping as $N_{NB}^{i} = (n_{NB}^{i_0} + f_{NB,hop}^{PUSCH}) \bmod N_{NB}$.

In another specific example, WB hopping component 52 can apply the frequency hopping offset to the resources of the wideband allocation in a second scheme, where the resource block indices after hopping can be $(RB_{START} + l + f_{NB,hop}^{PUSCH}) \bmod N_{RB}$ where the RB frequency hopping offset is defined as $f_{NB,hop}^{PUSCH} = 6(f_{NB,hop}^{PUSCH} \bmod N_{NB}) + \Delta_f$ Therefore, the RB frequency hopping offset based on $f_{NB,hop}^{PUSCH}$ is adjusted by an additional $\Delta_f$ when hopping cross the edge PRB(s) and/or center PRB, where $\Delta_f$ is defined as:

| $RB_{START}$ | $[RB_{START} + 6(f_{NB,hop}^{PUSCH} \bmod N_{NB})] \bmod N_{RB}^{UL}$ | $f_{NB,hop}^{PUSCH} \bmod N_{NB}$ | $\Delta_f$ |
|---|---|---|---|
| $\leq \lfloor \frac{N_{RB}^{UL}}{2} \rfloor$ (in left half BW) | $> \lfloor \frac{N_{RB}^{UL}}{2} \rfloor$ | | $1_c$ |
| | $\leq \lfloor \frac{N_{RB}^{UL}}{2} \rfloor$ | $\leq \lfloor \frac{N_{NB}}{2} \rfloor$ | 0 |
| | $\leq \lfloor \frac{N_{RB}^{UL}}{2} \rfloor$ | $> \lfloor \frac{N_{NB}}{2} \rfloor$ | $1_c + 1_e$ |
| $> \lfloor \frac{N_{RB}^{UL}}{2} \rfloor$ (in right half BW) | $\leq \lfloor \frac{N_{RB}^{UL}}{2} \rfloor$ | | $1_e$ |
| | $> \lfloor \frac{N_{RB}^{UL}}{2} \rfloor$ | $\leq \lfloor \frac{N_{NB}}{2} \rfloor$ | 0 |
| | $\leq \lfloor \frac{N_{RB}^{UL}}{2} \rfloor$ | $> \lfloor \frac{N_{NB}}{2} \rfloor$ | $1_c + 1_e$ | with $$l_e = \lfloor \frac{N_{RB}}{2} \rfloor - \frac{6N_{NB}}{2} \text{ (e.g., } l_e = 0,$$

1 or 2) is the edge PRB outside narrowbands and $l_c = N_{RB} - 6N_{NB} - 2l_e$ (e.g., $l_c = 0$ or 1) is the center RB outside narrowbands.

In another example, applying the frequency hopping offset can include determining whether to consider compatibility with legacy UEs, which can be enabled by higher layer signaling (e.g., RRC signaling from a base station). In this example, where WB hopping component 52 determines to consider compatibility with legacy UEs, WB hopping component 52 can apply hopping according to one of the schemes above. Where WB hopping component 52 determines to not consider compatibility with legacy UEs, WB hopping component 52 can apply hopping as $f_{NB,hop}^{PUSCH} = 6(f_{NB,hop}^{PUSCH} \bmod N_{NB})$.

In any case, at block 2010, method 2000 can include communicating the uplink data over resources related to the wideband allocation with the frequency hopping offset applied. In an aspect, for example, the resource allocation component 40, and/or WB hopping component 52, e.g., in conjunction with one or more of the processors 103, memory 130, modem 108, and/or transceiver 106, may be configured to communicate the uplink data over the resources related to the wideband allocation with the frequency hopping offset applied. This can include communicating the uplink data over frequency resources at indices (e.g., RB indices) determined by applying the offset to the resources, as described above. Moreover, this can include communicating the uplink data over the frequency resources with the frequency hopping offset applied in a given slot, subframe, or other collection of symbols over which the hopping is to occur. In an example, this can be a next time period (e.g., slot, subframe, or other collection of symbols) from a previous uplink transmission, or a time period configured by the base station, etc.

Where it is determined to not apply the frequency hopping offset at block 2006, at block 2012 method 2000 includes communicating the uplink data over resources related to the wideband allocation without applying the frequency hopping offset or refraining from communicating the uplink data. In an aspect, for example, the resource allocation component 40, and/or WB hopping component 52, e.g., in conjunction with one or more of the processors 103, memory 130, modem 108, and/or transceiver 106, may be configured to communicate the uplink data over resources related to the wideband allocation without applying the frequency hopping offset or refrain from communicating the uplink data. In an example, refraining from communicating the data can include determining to (or whether to) communicate the data in a subsequent time period.

In another example, determining whether to apply the frequency hopping offset at block 2006 can include determining not to apply hopping where applying the hopping would lead to wrap-around (e.g., where the resulting frequency would exceed a boundary of the system bandwidth, and thus the allocated resources could return to a starting resource of the system bandwidth) or transmission in edge PRBs (e.g., at an edge of the system bandwidth and/or at an edge of the narrowband(s)). In this example, method 2000 can include, at block 2012, refraining from communicating the data (e.g., the PUSCH transmission on the subframe is dropped and/or is transmitted in a subsequent time period).

In addition, for example, the RB indices after hopping can have a relative location that is the same as that of the initial narrowband allocation. In this example, method 2000 may optionally include, at block 2014, communicating subsequent uplink data over the resources related to the wideband allocation without the frequency hopping offset applied. In an aspect, for example, the resource allocation component 40, and/or WB hopping component 52, e.g., in conjunction with one or more of the processors 103, memory 130, modem 108, and/or transceiver 106, may be configured to communicate the subsequent uplink data over the resources related to the wideband allocation (e.g., the frequency resources in a subsequent subframe, slot, or other collection of one or more symbols) without the frequency hopping offset applied. That is, for example:

If $N_{RB}^{UL} \bmod 2=0$ or if $N_{RB}^{UL} \bmod 2=1$ and $RB_{START} < \lfloor N_{RB}^{UL}/2 \rfloor$, the RB indices after hopping are $$\begin{cases} (6n_{NB}^i + l_e + l_{START} + l) \bmod N_{RB}^{UL} & \text{if } n_{NB}^{i_0} = n_{NB,l=0} \\ (6n_{NB}^i + l_e + l_{END} - (L_{CRBs} - 1) + l) \bmod N_{RB}^{UL} & \text{else if } n_{NB}^{i_0} = n_{NB,l=L_{CRBs}-1} \\ RB_{START} + l & \text{otherwise} \end{cases}$$

where $$l_e = \lfloor \frac{N_{RB}^{UL}}{2} \rfloor - \frac{6N_{NB}}{2}$$

is the number of edge RBs outside the narrowbands;

$l_{START} = (RB_{START} - l_e) \bmod 6$ is the relative location of the starting point $RB_{START}$ in its located narrowband;

$l_{END} = (RB_{START} + L_{CRBs} - 1 - l_e) \bmod 6$ is the relative location of the ending point $(RB_{START} + L_{CRBs} - 1)$ in its located narrowband;

If $N_{RB}^{UL} \bmod 2=1$ and $RB_{START} \geq \lfloor N_{RB}^{UL}/2 \rfloor$, the center PRB outside the narrowband is taken into account and the RB indices after hopping are $$\begin{cases} (6n_{NB}^i + l_e + l_{START} + l + 1) \bmod N_{RB}^{UL} & \text{if } n_{NB}^{i_0} = n_{NB,l=0} \\ (6n_{NB}^i + l_e + l_{END} - (L_{CRBs} - 1) + l + 1) \bmod N_{RB}^{UL} & \text{else if } n_{NB}^{i_0} = n_{NB,l=L_{CRBs}-1} \\ RB_{START} + l & \text{otherwise} \end{cases}$$

where $$l_e = \left\lfloor \frac{N_{RB}^{UL}}{2} \right\rfloor - \frac{6N_{NB}}{2}$$

is the number of edge RBs outside the narrowbands;
$l_{START}=(RB_{START}-l_e-1) \bmod 6$ is the relative location of the starting point $RB_{START}$ in its located narrowband;
$l_{END}=(RB_{START}+L_{CRBs}-2-l_e) \bmod 6$ is the relative location of the ending point $(RB_{START}+L_{CRBs}-1)$ in its located narrowband;

For purposes of simplicity of explanation, the methods discussed herein are shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Several aspects of a telecommunications system have been presented with reference to a 4G or a 5G NR system. As those skilled in the art will readily appreciate, various aspects described throughout this disclosure may be extended to other telecommunication systems, network architectures and communication standards.

By way of example, various aspects may be extended to other communication systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. Moreover, nothing disclosed herein is intended to be dedicated to the public regardless of whether such disclosure is explicitly recited in the claims.

In the following, an overview of further examples is provided:

1. A method for wireless communication, comprising:
   determining a wideband allocation of resources for transmitting uplink wireless communications;
   determining a frequency hopping offset related to one or more narrowbands for transmitting uplink wireless communications;
   determining whether to apply the frequency hopping offset to the wideband allocation in communicating data; and
   communicating, based on determining to apply the frequency hopping offset, the data over resources related to the wideband allocation with the frequency hopping offset applied.

2. The method of example 1, wherein determining whether to apply the frequency hopping offset is based at least in part on determining a location of resources of the wideband allocation with respect to the one or more narrowbands, based at least on a narrowband location of the one or more narrowbands and the resources outside one or more narrowbands.

3. The method of example 2, wherein determining whether to apply the frequency hopping offset comprises determining to apply the frequency hopping offset where the resources of the wideband allocation are within the one or more narrowbands.

4. The method of any of examples 2 or 3, wherein determining whether to apply the frequency hopping offset comprises determining not to apply the frequency hopping offset where the resources of the wideband allocation are partially within the one or more narrowbands.

5. The method of any of examples 2 to 4, wherein determining whether to apply the frequency hopping offset comprises determining not to apply the frequency hopping offset where the resources of the wideband allocation are not within the one or more narrowbands.

6. The method of any of examples 2 to 5, wherein determining whether to apply the frequency hopping offset comprises determining not to apply the frequency hopping offset where a center resource block of the resources of the wideband allocation is not within the one or more narrowbands.

7. The method of any of examples 2 to 6, wherein determining whether to apply the frequency hopping offset comprises determining not to apply the frequency hopping offset where one or more edge resource blocks of the resources of the wideband allocation are within the one or more narrowbands.

8. The method of any of examples 1 to 7, further comprising communicating subsequent uplink data over the resources related to the wideband allocation without the frequency hopping offset applied.

9. The method of any of examples 1 to 8, wherein determining whether to apply the frequency hopping offset comprises determining not to apply the frequency hopping offset where at least one or more of the frequency hopped resources, determined based on applying the frequency hopping offset to the wideband allocation of resources, would be at least one of wrapped-around a system bandwidth, outside of the system bandwidth, or outside of the one or more narrowbands.

10. The method of any of examples 1 to 9, wherein determining whether to apply the frequency hopping offset comprises determining not to apply the frequency hopping offset where the wideband allocation of resources have a center resource block not belonging to the one or more narrowbands.

11. The method of any of examples 1 to 10, further comprising applying, based on determining to apply the frequency hopping offset, the frequency hopping offset to the wideband allocation of resources at least in part by adding the frequency hopping offset to a frequency of at least a portion of the wideband allocation of resources that are within the one or more narrowbands.

12. The method of example 11, further comprising determining the frequency hopping offset based at least in part on adding a different offset to the frequency hopping offset, wherein the different offset is determined based at least in part on a starting resource block of the wideband allocation of resources that is outside of the one or more narrowband allocations of resources or a center resource block of the wideband allocation of resources that is outside of the one or more narrowbands.

13. The method of any of examples 1 to 12, further comprising:
determining a scheme for frequency hopping based on a received indicator; and
applying, based on determining to apply the frequency hopping offset and based on the scheme, the frequency hopping offset to the wideband allocation of resources.

14. An apparatus for wireless communication, comprising:
a transceiver;
a memory configured to store instructions; and
one or more processors communicatively coupled with the transceiver and the memory, wherein the one or more processors are configured to:
determine a wideband allocation of resources for transmitting uplink wireless communications;
determine a frequency hopping offset related to one or more narrowbands for transmitting uplink wireless communications;
determine whether to apply the frequency hopping offset to the wideband allocation in communicating data; and
communicate, based on determining to apply the frequency hopping offset, the data over resources related to the wideband allocation with the frequency hopping offset applied.

15. The apparatus of example 14, wherein the one or more processors are configured to determine whether to apply the frequency hopping offset based at least in part on determining a location of resources of the wideband allocation with respect to the one or more narrowbands, based at least on a narrowband location of the one or more narrowbands and the resources outside one or more narrowbands.

16. The apparatus of example 15, wherein the one or more processors are configured to determine whether to apply the frequency hopping offset at least in part by determining to apply the frequency hopping offset where the resources of the wideband allocation are within the one or more narrowbands.

17. The apparatus of any of examples 15 or 16, wherein the one or more processors are configured to determine whether to apply the frequency hopping offset at least in part by determining not to apply the frequency hopping offset where the resources of the wideband allocation are partially within the one or more narrowbands.

18. The apparatus of any of examples 15 to 17, wherein the one or more processors are configured to determine whether to apply the frequency hopping offset at least in part by determining not to apply the frequency hopping offset where the resources of the wideband allocation are not within the one or more narrowbands.

19. The apparatus of any of examples 15 to 18, wherein the one or more processors are configured to determine whether to apply the frequency hopping offset at least in part by determining not to apply the frequency hopping offset where a center resource block of the resources of the wideband allocation is not within the one or more narrowbands.

20. The apparatus of any of examples 15 to 19, wherein the one or more processors are configured to determine whether to apply the frequency hopping offset at least in part by determining not to apply the frequency hopping offset where one or more edge resource blocks of the resources of the wideband allocation are within the one or more narrowbands.

21. The apparatus of any of examples 14 to 20, wherein the one or more processors are further configured to communicate subsequent uplink data over the resources related to the wideband allocation without the frequency hopping offset applied.

22. The apparatus of any of examples 14 to 21, wherein the one or more processors are configured to determine whether to apply the frequency hopping offset at least in part by determining not to apply the frequency hopping offset where at least one or more of the frequency hopped resources, determined based on applying the frequency hopping offset to the wideband allocation of resources, would be at least one of wrapped-around a system bandwidth, outside of the system bandwidth, or outside of the one or more narrowbands.

23. The apparatus of any of examples 14 to 22, wherein the one or more processors are configured to determine whether to apply the frequency hopping offset at least in part by determining not to apply the frequency hopping offset where the wideband allocation of resources have a center resource block not belonging to the one or more narrowbands.

24. The apparatus of any of examples 14 to 23, wherein the one or more processors are further configured to apply, based on determining to apply the frequency hopping offset, the frequency hopping offset to the wideband allocation of resources at least in part by adding the frequency hopping offset to a frequency of at least a portion of the wideband allocation of resources that are within the one or more narrowbands.

25. The apparatus of example 24, wherein the one or more processors are further configured to determine the frequency hopping offset based at least in part on adding a different offset to the frequency hopping offset, wherein the different offset is determined based at least in part on a starting resource block of the wideband allocation of resources that is outside of the one or more narrowband allocations of resources or a center resource block of the wideband allocation of resources that is outside of the one or more narrowbands.

26. The apparatus of any of examples 14 to 25, wherein the one or more processors are further configured to:
determine a scheme for frequency hopping based on a received indicator; and
apply, based on determining to apply the frequency hopping offset and based on the scheme, the frequency hopping offset to the wideband allocation of resources.

27. An apparatus for wireless communication, comprising:
means for determining a wideband allocation of resources for transmitting uplink wireless communications;
means for determining a frequency hopping offset related to one or more narrowbands for transmitting uplink wireless communications;
means for determining whether to apply the frequency hopping offset to the wideband allocation in communicating data; and
means for communicating, based on determining to apply the frequency hopping offset, the data over resources related to the wideband allocation with the frequency hopping offset applied.

28. The apparatus of example 27, wherein the means for determining determines whether to apply the frequency hopping offset based at least in part on determining a location of resources of the wideband allocation with respect to the one or more narrowbands, based at least on a narrowband location of the one or more narrowbands and the resources outside one or more narrowbands.

29. The apparatus of example 28, wherein the means for determining determines whether to apply the frequency hopping offset at least in part by determining to apply the frequency hopping offset where the resources of the wideband allocation are within the one or more narrowbands.

30. The apparatus of any of examples 28 or 29, wherein the means for determining determines whether to apply the frequency hopping offset at least in part by determining not to apply the frequency hopping offset where the resources of the wideband allocation are partially within the one or more narrowbands.

31. The apparatus of any of examples 28 to 30, wherein the means for determining determines whether to apply the frequency hopping offset at least in part by determining not to apply the frequency hopping offset where the resources of the wideband allocation are not within the one or more narrowbands.

32. The apparatus of any of examples 28 to 31, wherein the means for determining determines whether to apply the frequency hopping offset at least in part by determining not to apply the frequency hopping offset where a center resource block of the resources of the wideband allocation is not within the one or more narrowbands.

33. The apparatus of any of examples 28 to 32, wherein the means for determining determines whether to apply the frequency hopping offset at least in part by determining not to apply the frequency hopping offset where one or more edge resource blocks of the resources of the wideband allocation are within the one or more narrowbands.

34. The apparatus of any of examples 27 to 33, further comprising means for communicating subsequent uplink data over the resources related to the wideband allocation without the frequency hopping offset applied.

35. The apparatus of any of examples 27 to 34, wherein the means for determining determines whether to apply the frequency hopping offset at least in part by determining not to apply the frequency hopping offset where at least one or more of the frequency hopped resources, determined based on applying the frequency hopping offset to the wideband allocation of resources, would be at least one of wrapped-around a system bandwidth, outside of the system bandwidth, or outside of the one or more narrowbands.

36. The apparatus of any of examples 27 to 35, wherein the means for determining determines whether to apply the frequency hopping offset at least in part by determining not to apply the frequency hopping offset where the wideband allocation of resources have a center resource block not belonging to the one or more narrowbands.

37. A computer-readable medium, comprising code executable by one or more processors for wireless communication, the code comprising code for:
determining a wideband allocation of resources for transmitting uplink wireless communications;
determining a frequency hopping offset related to one or more narrowbands for transmitting uplink wireless communications;
determining whether to apply the frequency hopping offset to the wideband allocation in communicating data; and
communicating, based on determining to apply the frequency hopping offset, the data over resources related to the wideband allocation with the frequency hopping offset applied.

38. The computer-readable medium of example 37, wherein the code for determining determines whether to apply the frequency hopping offset based at least in part on determining a location of resources of the wideband allocation with respect to the one or more narrowbands, based at least on a narrowband location of the one or more narrowbands and the resources outside one or more narrowbands.

39. The computer-readable medium of example 38, wherein the code for determining determines whether to apply the frequency hopping offset at least in part by determining to apply the frequency hopping offset where the resources of the wideband allocation are within the one or more narrowbands.

40. The computer-readable medium of any of examples 38 or 39, wherein the code for determining determines whether to apply the frequency hopping offset at least in part by determining not to apply the frequency hopping offset where the resources of the wideband allocation are partially within the one or more narrowbands.

41. The computer-readable medium of any of examples 38 to 40, wherein the code for determining determines whether to apply the frequency hopping offset at least in part by determining not to apply the frequency hopping offset where the resources of the wideband allocation are not within the one or more narrowbands.

42. The computer-readable medium of any of examples 38 to 41, wherein the code for determining determines whether to apply the frequency hopping offset at least in part by determining not to apply the frequency hopping offset where a center resource block of the resources of the wideband allocation is not within the one or more narrowbands.

43. The computer-readable medium of any of examples 38 to 42, wherein the code for determining determines whether to apply the frequency hopping offset at least in part by determining not to apply the frequency hopping offset where one or more edge resource blocks of the resources of the wideband allocation are within the one or more narrowbands.

44. The computer-readable medium of any of examples 37 to 43, further comprising code for communicating subsequent uplink data over the resources related to the wideband allocation without the frequency hopping offset applied.

45. The computer-readable medium of any of examples 37 to 44, wherein the code for determining determines whether to apply the frequency hopping offset at least in part by determining not to apply the frequency hopping offset where at least one or more of the frequency hopped resources, determined based on applying the frequency hopping offset to the wideband allocation of resources, would be at least one of wrapped-around a system bandwidth, outside of the system bandwidth, or outside of the one or more narrowbands.

46. The computer-readable medium of any of examples 37 to 45, wherein the code for determining determines whether to apply the frequency hopping offset at least in part by determining not to apply the frequency hopping offset where the wideband allocation of resources have a center resource block not belonging to the one or more narrowbands.

What is claimed is:

1. A method for wireless communication, comprising:
    determining a wideband allocation of resources for transmitting uplink wireless communications;
    determining a frequency hopping offset related to one or more narrowbands for transmitting uplink wireless communications;
    determining whether to apply the frequency hopping offset to the wideband allocation in communicating data based, at least in part, on a location of resources of the wideband allocation with respect to the one or more narrowbands; and
    communicating, based on determining whether to apply the frequency hopping offset, the data over resources related to the wideband allocation with the frequency hopping offset applied.

2. The method of claim 1, wherein determining whether to apply the frequency hopping offset comprises determining not to apply the frequency hopping offset based at least in part on determining the location of resources of the wideband allocation with respect to the one or more narrowbands.

3. The method of claim 1, wherein determining whether to apply the frequency hopping offset comprises determining to apply the frequency hopping offset where resources of the wideband allocation are within the one or more narrowbands.

4. The method of claim 2, wherein determining whether to apply the frequency hopping offset comprises determining not to apply the frequency hopping offset where the resources of the wideband allocation are partially within the one or more narrowbands.

5. The method of claim 2, wherein determining whether to apply the frequency hopping offset comprises determining not to apply the frequency hopping offset where the resources of the wideband allocation are not within the one or more narrowbands.

6. The method of claim 2, wherein determining whether to apply the frequency hopping offset comprises determining not to apply the frequency hopping offset where a center resource block of the resources of the wideband allocation is not within the one or more narrowbands.

7. The method of claim 2, wherein determining whether to apply the frequency hopping offset comprises determining not to apply the frequency hopping offset where one or more edge resource blocks of the resources of the wideband allocation are within the one or more narrowbands.

8. The method of claim 3, further comprising communicating subsequent uplink data over the resources related to the wideband allocation without the frequency hopping offset applied.

9. The method of claim 1, wherein determining whether to apply the frequency hopping offset comprises determining not to apply the frequency hopping offset where at least one or more of the frequency hopped resources, determined based on applying the frequency hopping offset to the wideband allocation of resources, would be at least one of wrapped-around a system bandwidth, outside of the system bandwidth, or outside of the one or more narrowbands.

10. The method of claim 1, wherein determining whether to apply the frequency hopping offset comprises determining not to apply the frequency hopping offset where the wideband allocation of resources have a center resource block not belonging to the one or more narrowbands.

11. The method of claim 1, further comprising applying, based on determining to apply the frequency hopping offset, the frequency hopping offset to the wideband allocation of resources at least in part by adding the frequency hopping offset to a frequency of at least a portion of the wideband allocation of resources that are within the one or more narrowbands.

12. The method of claim 11, further comprising determining the frequency hopping offset based at least in part on adding a different offset to the frequency hopping offset, wherein the different offset is determined based at least in part on a starting resource block of the wideband allocation of resources that is outside of the one or more narrowbands or a center resource block of the wideband allocation of resources that is outside of the one or more narrowbands.

13. The method of claim 1, further comprising:
    determining a scheme for frequency hopping based on a received indicator; and
    applying, based on determining to apply the frequency hopping offset and based on the scheme, the frequency hopping offset to the wideband allocation of resources.

14. An apparatus for wireless communication, comprising:
    a transceiver;
    a memory configured to store instructions; and
    one or more processors communicatively coupled with the transceiver and the memory, wherein the one or more processors are configured to:
        determine a wideband allocation of resources for transmitting uplink wireless communications;

determine a frequency hopping offset related to one or more narrowbands for transmitting uplink wireless communications;

determine whether to apply the frequency hopping offset to the wideband allocation in communicating data based, at least in part, on a location of resources of the wideband allocation with respect to the one or more narrowbands; and communicate, based on determining whether to apply the frequency hopping offset, the data over resources related to the wideband allocation with the frequency hopping offset applied.

15. The apparatus of claim 14, wherein the one or more processors are configured to determine to not apply the frequency hopping offset based at least in part on determining the location of resources of the wideband allocation with respect to the one or more narrowbands.

16. The apparatus of claim 14, wherein the one or more processors are configured to determine whether to apply the frequency hopping offset at least in part by determining to apply the frequency hopping offset where the resources of the wideband allocation are within the one or more narrowbands.

17. The apparatus of claim 15, wherein the one or more processors are configured to determine whether to apply the frequency hopping offset at least in part by determining not to apply the frequency hopping offset where the resources of the wideband allocation are partially within the one or more narrowbands.

18. The apparatus of claim 15, wherein the one or more processors are configured to determine whether to apply the frequency hopping offset at least in part by determining not to apply the frequency hopping offset where the resources of the wideband allocation are not within the one or more narrowbands.

19. The apparatus of claim 15, wherein the one or more processors are configured to determine whether to apply the frequency hopping offset at least in part by determining not to apply the frequency hopping offset where a center resource block of the resources of the wideband allocation is not within the one or more narrowbands.

20. The apparatus of claim 15, wherein the one or more processors are configured to determine whether to apply the frequency hopping offset at least in part by determining not to apply the frequency hopping offset where one or more edge resource blocks of the resources of the wideband allocation are within the one or more narrowbands.

21. The apparatus of claim 16, wherein the one or more processors are further configured to communicate subsequent uplink data over the resources related to the wideband allocation without the frequency hopping offset applied.

22. The apparatus of claim 14, wherein the one or more processors are configured to determine whether to apply the frequency hopping offset at least in part by determining not to apply the frequency hopping offset where at least one or more of the frequency hopped resources, determined based on applying the frequency hopping offset to the wideband allocation of resources, would be at least one of wrapped-around a system bandwidth, outside of the system bandwidth, or outside of the one or more narrowbands.

23. The apparatus of claim 14, wherein the one or more processors are configured to determine whether to apply the frequency hopping offset at least in part by determining not to apply the frequency hopping offset where the wideband allocation of resources have a center resource block not belonging to the one or more narrowbands.

24. The apparatus of claim 14, wherein the one or more processors are further configured to apply, based on determining to apply the frequency hopping offset, the frequency hopping offset to the wideband allocation of resources at least in part by adding the frequency hopping offset to a frequency of at least a portion of the wideband allocation of resources that are within the one or more narrowbands.

25. The apparatus of claim 24, wherein the one or more processors are further configured to determine the frequency hopping offset based at least in part on adding a different offset to the frequency hopping offset, wherein the different offset is determined based at least in part on a starting resource block of the wideband allocation of resources that is outside of the one or more narrowbands or a center resource block of the wideband allocation of resources that is outside of the one or more narrowbands.

26. The apparatus of claim 14, wherein the one or more processors are further configured to:

determine a scheme for frequency hopping based on a received indicator; and apply, based on determining to apply the frequency hopping offset and based on the scheme, the frequency hopping offset to the wideband allocation of resources.

27. An apparatus for wireless communication, comprising:

means for determining a wideband allocation of resources for transmitting uplink wireless communications;

means for determining a frequency hopping offset related to one or more narrowbands for transmitting uplink wireless communications;

means for determining whether to apply the frequency hopping offset to the wideband allocation in communicating data based, at least in part, on a location of resources of the wideband allocation with respect to the one or more narrowbands; and means for communicating, based on determining whether to apply the frequency hopping offset, the data over resources related to the wideband allocation with the frequency hopping offset applied.

28. The apparatus of claim 27, wherein the means for determining whether to apply the frequency hopping offset determines to not apply the frequency hopping offset based at least in part on determining the location of resources of the wideband allocation with respect to the one or more narrowbands.

29. The apparatus of claim 27, wherein the means for determining determines whether to apply the frequency hopping offset at least in part by determining to apply the frequency hopping offset where the resources of the wideband allocation are within the one or more narrowbands.

30. The apparatus of claim 28, wherein the means for determining determines whether to apply the frequency hopping offset at least in part by determining not to apply the frequency hopping offset where the resources of the wideband allocation are partially within the one or more narrowbands.

31. The apparatus of claim 28, wherein the means for determining determines whether to apply the frequency hopping offset at least in part by determining not to apply the frequency hopping offset where the resources of the wideband allocation are not within the one or more narrowbands.

32. The apparatus of claim 28, wherein the means for determining determines whether to apply the frequency hopping offset at least in part by determining not to apply the frequency hopping offset where a center resource block of the resources of the wideband allocation is not within the one or more narrowbands.

33. The apparatus of claim 28, wherein the means for determining determines whether to apply the frequency hopping offset at least in part by determining not to apply the frequency hopping offset where one or more edge resource blocks of the resources of the wideband allocation are within the one or more narrowbands.

34. The apparatus of claim 29, further comprising means for communicating subsequent uplink data over the resources related to the wideband allocation without the frequency hopping offset applied.

35. The apparatus of claim 27, wherein the means for determining determines whether to apply the frequency hopping offset at least in part by determining not to apply the frequency hopping offset where at least one or more of the frequency hopped resources, determined based on applying the frequency hopping offset to the wideband allocation of resources, would be at least one of wrapped-around a system bandwidth, outside of the system bandwidth, or outside of the one or more narrowbands.

36. The apparatus of claim 27, wherein the means for determining determines whether to apply the frequency hopping offset at least in part by determining not to apply the frequency hopping offset where the wideband allocation of resources have a center resource block not belonging to the one or more narrowbands.

37. A non-transitory computer-readable medium, comprising code executable by one or more processors for wireless communication, the code comprising code for:
   determining a wideband allocation of resources for transmitting uplink wireless communications;
   determining a frequency hopping offset related to one or more narrowbands for transmitting uplink wireless communications;
   determining whether to apply the frequency hopping offset to the wideband allocation in communicating data based, at least in part, on a location of resources of the wideband allocation with respect to the one or more narrowbands; and
   communicating, based on determining whether to apply the frequency hopping offset, the data over resources related to the wideband allocation with the frequency hopping offset applied.

38. The non-transitory computer-readable medium of claim 37, wherein the code for determining whether to apply the frequency hopping offset determines to not apply the frequency hopping offset based at least in part on determining the location of resources of the wideband allocation with respect to the one or more narrowbands.

39. The non-transitory computer-readable medium of claim 37, wherein the code for determining determines whether to apply the frequency hopping offset at least in part by determining to apply the frequency hopping offset where the resources of the wideband allocation are within the one or more narrowbands.

40. The non-transitory computer-readable medium of claim 38, wherein the code for determining determines whether to apply the frequency hopping offset at least in part by determining not to apply the frequency hopping offset where the resources of the wideband allocation are partially within the one or more narrowbands.

41. The non-transitory computer-readable medium of claim 38, wherein the code for determining determines whether to apply the frequency hopping offset at least in part by determining not to apply the frequency hopping offset where the resources of the wideband allocation are not within the one or more narrowbands.

42. The non-transitory computer-readable medium of claim 38, wherein the code for determining determines whether to apply the frequency hopping offset at least in part by determining not to apply the frequency hopping offset where a center resource block of the resources of the wideband allocation is not within the one or more narrowbands.

43. The non-transitory computer-readable medium of claim 38, wherein the code for determining determines whether to apply the frequency hopping offset at least in part by determining not to apply the frequency hopping offset where one or more edge resource blocks of the resources of the wideband allocation are within the one or more narrowbands.

44. The non-transitory computer-readable medium of claim 39, further comprising code for communicating subsequent uplink data over the resources related to the wideband allocation without the frequency hopping offset applied.

45. The non-transitory computer-readable medium of claim 37, wherein the code for determining determines whether to apply the frequency hopping offset at least in part by determining not to apply the frequency hopping offset where at least one or more of the frequency hopped resources, determined based on applying the frequency hopping offset to the wideband allocation of resources, would be at least one of wrapped-around a system bandwidth, outside of the system bandwidth, or outside of the one or more narrowbands.

46. The non-transitory computer-readable medium of claim 37, wherein the code for determining determines whether to apply the frequency hopping offset at least in part by determining not to apply the frequency hopping offset where the wideband allocation of resources have a center resource block not belonging to the one or more narrowbands.

* * * * *